US010397293B2

(12) United States Patent
McGowan

(10) Patent No.: US 10,397,293 B2
(45) Date of Patent: *Aug. 27, 2019

(54) DYNAMIC CHUNKING FOR DELIVERY INSTANCES

(71) Applicant: Brightcove, Inc., Boston, MA (US)

(72) Inventor: Albert John McGowan, Phoenix, AZ (US)

(73) Assignee: Brightcove, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/820,993

(22) Filed: Nov. 22, 2017

(65) Prior Publication Data

US 2018/0167432 A1 Jun. 14, 2018

Related U.S. Application Data

(63) Continuation of application No. 13/791,789, filed on Mar. 8, 2013, now Pat. No. 9,838,450, which is a (Continued)

(30) Foreign Application Priority Data

Jun. 30, 2010 (AU) .................. 2010202741

(51) Int. Cl.
*G06F 15/16* (2006.01)
*H04L 29/06* (2006.01)
(Continued)

(52) U.S. Cl.
CPC .............. *H04L 65/60* (2013.01); *G06F 9/06* (2013.01); *H04L 29/00* (2013.01);
(Continued)

(58) Field of Classification Search
CPC ......... H04L 2012/2849; H04L 12/2805; H04L 12/282; H04N 21/8456; H04N 21/812
See application file for complete search history.

(56) References Cited

U.S. PATENT DOCUMENTS 5,612,742 A 3/1997 Krause et al.
5,887,243 A 3/1999 Harvey et al.
(Continued)

FOREIGN PATENT DOCUMENTS

AU 2010202740 B1 6/2010
AU 2010202782 B1 7/2010
(Continued)

OTHER PUBLICATIONS

Gabin, F. et al. "3GPP Mobile Multimedia Streaming Standards [Standards in a Nutshell]", IEEE Signal Processing Magazine, IEEE Service Center, Piscataway, NJ, US, vol. 27, No. 6, Nov. 1, 2010, pp. 134-138, XPO11317684, ISSN: 1053-5888, p. 135-p. 137.
(Continued)

*Primary Examiner* — Aftab N. Khan
*Assistant Examiner* — Gregory P Tolchinsky
(74) *Attorney, Agent, or Firm* — Kilpatrick Townsend & Stockton, LLP

(57) ABSTRACT

Techniques are provided for dynamically creating index files for streaming media based on a determined chunking strategy. The chunking strategy can be determined using historical data of any of a variety of factors, such as Quality of Service (QoS) information. By using historical data in this manner, index files can be generated using chunking strategies that can improve these factors over time.

19 Claims, 13 Drawing Sheets

Related U.S. Application Data continuation-in-part of application No. 13/624,029, filed on Sep. 21, 2012, now Pat. No. 8,645,504, which is a continuation of application No. 13/430,081, filed on Mar. 26, 2012, now Pat. No. 8,301,733, which is a continuation-in-part of application No. 12/976,883, filed on Dec. 22, 2010, now Pat. No. 8,145,782.

(51) Int. Cl.
| | | |
|---|---|---|
| G06F 9/06 | (2006.01) | |
| H04L 29/00 | (2006.01) | |
| H04N 21/24 | (2011.01) | |
| H04N 21/258 | (2011.01) | |
| H04N 21/262 | (2011.01) | |
| H04N 21/442 | (2011.01) | |
| H04N 21/61 | (2011.01) | |
| H04N 21/658 | (2011.01) | |
| H04N 21/845 | (2011.01) | |
| H04L 29/08 | (2006.01) | |
| H04N 21/231 | (2011.01) | |
| H04N 21/81 | (2011.01) | |
| H04N 21/2347 | (2011.01) | |
| H04N 21/266 | (2011.01) | |

(52) U.S. Cl.
CPC ...... *H04L 65/1063* (2013.01); *H04L 65/1089* (2013.01); *H04L 65/605* (2013.01); *H04L 65/80* (2013.01); *H04L 67/322* (2013.01); *H04N 21/2402* (2013.01); *H04N 21/25808* (2013.01); *H04N 21/26258* (2013.01); *H04N 21/44222* (2013.01); *H04N 21/6125* (2013.01); *H04N 21/6582* (2013.01); *H04N 21/8456* (2013.01); *H04N 21/2347* (2013.01); *H04N 21/23106* (2013.01); *H04N 21/26613* (2013.01); *H04N 21/812* (2013.01)

(56) References Cited

U.S. PATENT DOCUMENTS

| | | |
|---|---|---|
| 6,370,199 B1 | 4/2002 | Bock et al. |
| 6,505,169 B1 | 1/2003 | Bhagavath et al. |
| 6,678,332 B1 | 1/2004 | Gardere et al. |
| 6,792,047 B1 | 9/2004 | Bixby et al. |
| 6,792,618 B1* | 9/2004 | Bendinelli ......... H04N 7/17318 348/E7.071 |
| 6,912,315 B1 | 6/2005 | Wong et al. |
| 7,096,481 B1 | 8/2006 | Forecast et al. |
| 7,116,894 B1 | 10/2006 | Chatterton |
| 7,788,581 B1 | 8/2010 | Bauermeister |
| 7,827,298 B2 | 11/2010 | Black et al. |
| 7,877,511 B1 | 1/2011 | Berger et al. |
| 7,925,549 B2 | 4/2011 | Looney et al. |
| 7,925,774 B2 | 4/2011 | Zhang et al. |
| 7,925,849 B2 | 4/2011 | Izumi |
| 7,958,007 B2 | 6/2011 | Urbanski et al. |
| 7,992,165 B1 | 8/2011 | Ludewig et al. |
| 7,996,566 B1 | 8/2011 | Sylvain et al. |
| 8,027,787 B2 | 9/2011 | Odinak et al. |
| 8,027,876 B2 | 9/2011 | Taylor |
| 8,099,473 B2 | 1/2012 | Biderman et al. |
| 8,145,782 B2 | 3/2012 | McGowan et al. |
| 8,165,343 B1 | 4/2012 | McGowan |
| 8,218,651 B1 | 7/2012 | Eshet et al. |
| 8,239,546 B1 | 8/2012 | McGowan |
| 8,250,617 B2 | 8/2012 | Hensgen et al. |
| 8,301,733 B2 | 10/2012 | McGowan |
| 8,386,630 B1* | 2/2013 | Atzmon ............. H04L 65/605 455/41.2 |
| 8,862,754 B2 | 10/2014 | McGowan |
| 8,954,540 B2 | 2/2015 | McGowan et al. |
| 9,112,939 B2 | 8/2015 | Johnson |
| 9,240,922 B2 | 1/2016 | McGowan |
| 9,762,639 B2 | 9/2017 | McGowan et al. |
| 2001/0029525 A1 | 10/2001 | Lahr |
| 2002/0029282 A1 | 3/2002 | Buddhikot et al. |
| 2002/0046404 A1 | 4/2002 | Mizutani |
| 2002/0073084 A1 | 6/2002 | Kauffman et al. |
| 2002/0104096 A1 | 8/2002 | Cramer et al. |
| 2002/0122430 A1 | 9/2002 | Haberman et al. |
| 2002/0144262 A1 | 10/2002 | Plotnick et al. |
| 2002/0150239 A1 | 10/2002 | Carny et al. |
| 2003/0004804 A1 | 1/2003 | Landsman et al. |
| 2003/0018966 A1 | 1/2003 | Cook et al. |
| 2003/0046274 A1 | 3/2003 | Erickson et al. |
| 2003/0229900 A1 | 12/2003 | Reisman |
| 2004/0022391 A1 | 2/2004 | O'Brien |
| 2004/0268384 A1 | 12/2004 | Stone |
| 2005/0060229 A1 | 3/2005 | Riedl et al. |
| 2005/0076368 A1 | 4/2005 | Lee |
| 2005/0151859 A1* | 7/2005 | Kuriyama ............. H04N 5/772 348/231.99 |
| 2005/0151959 A1 | 7/2005 | Geurts |
| 2005/0163229 A1 | 7/2005 | Okada et al. |
| 2005/0193205 A1 | 9/2005 | Jacobs et al. |
| 2005/0207569 A1 | 9/2005 | Zhang et al. |
| 2005/0209927 A1 | 9/2005 | Aaltonen et al. |
| 2006/0015637 A1 | 1/2006 | Chung |
| 2006/0075449 A1 | 4/2006 | Jagadeesan et al. |
| 2006/0114985 A1 | 6/2006 | Linzer |
| 2006/0122882 A1 | 6/2006 | Brown et al. |
| 2006/0129907 A1 | 6/2006 | Volk et al. |
| 2006/0184410 A1 | 8/2006 | Ramamurthy et al. |
| 2006/0288112 A1 | 12/2006 | Soelberg et al. |
| 2007/0038567 A1 | 2/2007 | Allaire et al. |
| 2007/0053513 A1 | 3/2007 | Hoffberg |
| 2007/0078712 A1 | 4/2007 | Ott, IV et al. |
| 2007/0094082 A1 | 4/2007 | Yruski et al. |
| 2007/0162571 A1 | 7/2007 | Gupta et al. |
| 2007/0168542 A1 | 7/2007 | Gupta et al. |
| 2007/0198416 A1 | 8/2007 | Ye |
| 2007/0204310 A1 | 8/2007 | Hua et al. |
| 2007/0233891 A1 | 10/2007 | Luby et al. |
| 2007/0255618 A1 | 11/2007 | Meerbergen et al. |
| 2007/0294100 A1 | 12/2007 | Chen et al. |
| 2007/0299870 A1 | 12/2007 | Finch |
| 2008/0005349 A1 | 1/2008 | Li et al. |
| 2008/0059310 A1 | 3/2008 | Lettow et al. |
| 2008/0091845 A1 | 4/2008 | Wills et al. |
| 2008/0141027 A1 | 6/2008 | Kim et al. |
| 2008/0195761 A1 | 8/2008 | Jabri et al. |
| 2008/0207182 A1 | 8/2008 | Maharajh et al. |
| 2008/0215620 A1 | 9/2008 | Folgner et al. |
| 2009/0003432 A1 | 1/2009 | Liu et al. |
| 2009/0022172 A1 | 1/2009 | Haberman et al. |
| 2009/0031424 A1 | 1/2009 | Ganesan et al. |
| 2009/0037211 A1 | 2/2009 | McGill et al. |
| 2009/0063280 A1 | 3/2009 | Wurster et al. |
| 2009/0089846 A1* | 4/2009 | Wang ................. H04N 7/17318 725/98 |
| 2009/0094634 A1 | 4/2009 | Haberman et al. |
| 2009/0147840 A1 | 6/2009 | Sahdra et al. |
| 2009/0150941 A1 | 6/2009 | Riedl et al. |
| 2009/0172197 A1 | 7/2009 | Kalaboukis et al. |
| 2009/0182593 A1 | 7/2009 | Whitmore |
| 2009/0216790 A1* | 8/2009 | Dexter .................. G06F 17/24 |
| 2009/0217316 A1 | 8/2009 | Gupta |
| 2009/0254572 A1 | 10/2009 | Redlich et al. |
| 2009/0257435 A1 | 10/2009 | Karlsson et al. |
| 2009/0259941 A1 | 10/2009 | Kennedy, Jr. |
| 2009/0282077 A1 | 11/2009 | Thomas |
| 2009/0287841 A1 | 11/2009 | Chapweske et al. |
| 2009/0296827 A1* | 12/2009 | Karaoguz ......... H04N 21/23439 375/240.26 |
| 2009/0300145 A1 | 12/2009 | Musayev et al. |
| 2009/0320063 A1 | 12/2009 | Barrett |
| 2009/0327896 A1 | 12/2009 | Pall et al. |
| 2010/0057926 A1 | 3/2010 | Cao et al. |
| 2010/0070608 A1 | 3/2010 | Hosur |
| 2010/0070996 A1 | 3/2010 | Liao et al. |
| 2010/0095121 A1 | 4/2010 | Shetty et al. |

(56) References Cited

U.S. PATENT DOCUMENTS

| | | | |
|---|---|---|---|
| 2010/0100742 A1 | 4/2010 | Courington et al. | |
| 2010/0107200 A1 | 4/2010 | Drang et al. | |
| 2010/0114943 A1* | 5/2010 | Fu | H04L 41/0893 707/769 |
| 2010/0118973 A1 | 5/2010 | Rodriguez et al. | |
| 2010/0122286 A1 | 5/2010 | Begeja et al. | |
| 2010/0129057 A1 | 5/2010 | Kulkarni | |
| 2010/0138892 A1 | 6/2010 | Meuninck et al. | |
| 2010/0161425 A1 | 6/2010 | Sideman | |
| 2010/0169303 A1 | 7/2010 | Biderman et al. | |
| 2010/0189131 A1 | 7/2010 | Branam et al. | |
| 2010/0205049 A1 | 8/2010 | Long et al. | |
| 2010/0235438 A1* | 9/2010 | Narayanan | G06F 15/16 709/203 |
| 2010/0235472 A1* | 9/2010 | Sood | H04L 65/4092 709/219 |
| 2010/0318672 A1 | 12/2010 | Bouazizi | |
| 2011/0029999 A1 | 2/2011 | Foti | |
| 2011/0058792 A1 | 3/2011 | Towner et al. | |
| 2011/0066703 A1 | 3/2011 | Kaplan et al. | |
| 2011/0071911 A1 | 3/2011 | Tung et al. | |
| 2011/0082924 A1* | 4/2011 | Gopalakrishnan | H04L 65/4084 709/223 |
| 2011/0099204 A1* | 4/2011 | Thaler | G06F 9/5038 707/797 |
| 2011/0161181 A1 | 6/2011 | Esteve Asensio et al. | |
| 2011/0197219 A1 | 8/2011 | Ross | |
| 2011/0231660 A1 | 9/2011 | Kanungo | |
| 2011/0238507 A1 | 9/2011 | Ben-Rubi | |
| 2011/0246603 A1 | 10/2011 | Lee | |
| 2011/0246659 A1 | 10/2011 | Bouazizi | |
| 2011/0246661 A1* | 10/2011 | Manzari | G06Q 30/02 709/231 |
| 2011/0252082 A1 | 10/2011 | Cobb et al. | |
| 2011/0264506 A1 | 10/2011 | Grant et al. | |
| 2011/0287748 A1 | 11/2011 | Angel et al. | |
| 2011/0307623 A1 | 12/2011 | George et al. | |
| 2012/0005312 A1 | 1/2012 | McGowan et al. | |
| 2012/0005313 A1 | 1/2012 | McGowan et al. | |
| 2012/0023253 A1 | 1/2012 | Rhyu et al. | |
| 2012/0047542 A1 | 2/2012 | Lewis et al. | |
| 2012/0110117 A1 | 5/2012 | Koreeda | |
| 2012/0134355 A1 | 5/2012 | Vendrow et al. | |
| 2012/0137015 A1 | 5/2012 | Sun | |
| 2012/0167132 A1 | 6/2012 | Mathews et al. | |
| 2012/0179788 A1 | 7/2012 | McGowan | |
| 2012/0185530 A1 | 7/2012 | Reza | |
| 2012/0185608 A1 | 7/2012 | McGowan et al. | |
| 2012/0197419 A1 | 8/2012 | Dhruv et al. | |
| 2012/0198492 A1 | 8/2012 | Dhruv et al. | |
| 2012/0224592 A1 | 9/2012 | Henry et al. | |
| 2012/0233345 A1 | 9/2012 | Hannuksela | |
| 2012/0265892 A1 | 10/2012 | Ma et al. | |
| 2012/0272262 A1 | 10/2012 | Alexander et al. | |
| 2013/0007799 A1 | 1/2013 | Sandoval | |
| 2013/0042015 A1 | 2/2013 | Begen et al. | |
| 2013/0080268 A1 | 3/2013 | Gordon et al. | |
| 2013/0080579 A1 | 3/2013 | Gordon et al. | |
| 2013/0083859 A1 | 4/2013 | Nemiroff et al. | |
| 2013/0110978 A1 | 5/2013 | Gordon et al. | |
| 2013/0219428 A1 | 8/2013 | Jennings et al. | |
| 2013/0254346 A1 | 9/2013 | McGowan | |
| 2013/0268961 A1 | 10/2013 | Miles et al. | |
| 2013/0317919 A1 | 11/2013 | Raman et al. | |
| 2014/0150019 A1 | 5/2014 | Ma et al. | |
| 2014/0189139 A1 | 7/2014 | Cheng et al. | |
| 2014/0304377 A1 | 10/2014 | Andersson et al. | |
| 2014/0316899 A1 | 10/2014 | McGowan et al. | |
| 2014/0351383 A1 | 11/2014 | Wan et al. | |
| 2014/0372624 A1 | 12/2014 | Wang et al. | |
| 2015/0095461 A1 | 4/2015 | McGowan et al. | |
| 2015/0095511 A1 | 4/2015 | McGowan et al. | |
| 2016/0119397 A1 | 4/2016 | Johnson | |

FOREIGN PATENT DOCUMENTS

| | | |
|---|---|---|
| AU | 2010/202741 B1 | 12/2010 |
| AU | 2013240558 | 4/2016 |
| CN | 101282478 A | 10/2008 |
| GB | 2462732 B | 11/2010 |
| GB | 2514519 A | 11/2014 |
| GB | 2514027 A | 12/2014 |
| GB | 2515683 | 12/2014 |
| WO | 2010/025686 A1 | 3/2010 |
| WO | 2011/009205 A1 | 1/2011 |
| WO | 2011/039617 A1 | 4/2011 |
| WO | 2012/175145 A1 | 12/2012 |
| WO | 2013/101814 A1 | 7/2013 |
| WO | 2013/101841 A1 | 7/2013 |
| WO | 2013/148003 A1 | 10/2013 |
| WO | 2015-047959 A1 | 4/2015 |

OTHER PUBLICATIONS

International Search Report and Written Opinion of PCT/US2012/071669 dated Apr. 5, 2013, 74 pages.

Prangl, M. et al. "Towards QoS Improvements of TCP-Based Media Delivery," Networking and Services, 2008, ICNS 2008: Fourth International Conference on IEEE, Piscataway, NJ, USA, Mar. 16, 2008, 6 pages.

International Search Report and Written Opinion of PCT/US2012/071629 dated Apr. 5, 2013, 92 pages.

International Search Report and Written Opinion of PCT/US2013/025180 dated Jun. 5, 2013, 105 pages.

SDK Compatibility Guide, "Overview of SDK-Based Development", Nov. 15, 2010, Apple Inc., 2 pages, https://developer.apple.com/library/mac/documentation/DeveloperTools/Conceptual/cross_development/Overview/overview.html.

International Preliminary Report on Patentability for PCT/US2014/013724, dated Aug. 18, 2015, all pages.

U.S. Appl. No. 13/791,789 Non Final Rejection dated Nov. 2, 2016, all pages.

International Preliminary Report on Patentability for PCT/US2013/025180 dated Oct. 9, 2014, 9 pages.

International Search Report and Written Opinioin of PCT/US2013/023181, dated May 8, 2013, 91 pages.

International Preliminary Report on Patentability for PCT/US2013/023181, dated Oct. 9, 2014, 6 pages.

International Search Report and Written Opinion of PCT/US2014/013724, dated May 27, 2014, all pages.

U.S. Appl. No. 13/791,789, filed Mar. 8, 2013, Final Office Action dated Jun. 18, 2015, 24 pages.

U.S. Appl. No. 13/791,789, filed Mar. 8, 2013, Non-Final Office Action dated Feb. 5, 2015, 43 pages.

U.S. Appl. No. 13/791,789, filed Mar. 8, 2013, Non-Final Office Action dated Jan. 4, 2016, all pages.

U.S. Appl. No. 13/791,789, filed Mar. 8, 2013, Final Office Action dated Apr. 22, 2016, 27 pages.

U.S. Appl. No. 12/976,883, filed Dec. 22, 2010, Final Office Action dated Dec. 20, 2011, 11 pages.

U.S. Appl. No. 12/976,883, filed Dec. 22, 2010, Non-Final Office Action dated Jul. 7, 2011, 11 pages.

International Search Report and Written Opinion dated May 14, 2014, PCT/US2014/017945, 10 pages.

International Preliminary Report on Patentability for PCT/US2014/017945, dated Sep. 8, 2015, 8 pages.

DVB Organization: "TM—IPI—2552r12—CDS—Specification_clean.doc", DVB, Digital Video Broadcasting, c/o EBU—17A Ancienne Route—CH-1218 Grand Saconnex, Geneva—Switzerland, Sep. 11, 2008, XP017811009, sections 3.1-3.2, section 4; p. 20, section 4.2.2.2, section 4.2.4, section 5.2.5.

International Preliminary Report on Patentability for PCT/US2012/071629, dated Jul. 10, 2014, 8 pages.

International Preliminary Report on Patentability for PCT/US2012/071669, dated Jul. 10, 2014, 7 pages.

U.S. Appl. No. 15/355,548, filed Nov. 18, 2016 Non-Final Rejection dated May 7, 2018, all pages.

(56) References Cited

OTHER PUBLICATIONS

Examination Report No. 2 for AU Patent Application No. 2012362500 dated Apr. 4, 2018, 4 pages.
Office action dated Aug. 8, 2018 in related Canadian Patent Application No. 2,861,811, all pages.
Office Action dated Nov. 14, 2018 in Canadian Patent Application No. 2,867,161, all pages.
Original International Patent dated Apr. 12, 2011 in Australian Patent Application No. 2010202741, all pages.
Final Office Action dated Apr. 27, 2016 in U.S. Appl. No. 13/245,372, all pages.
Non-Final Office Action dated Dec. 10, 2015 in U.S. Appl. No. 13/245,372, all pages.
Non-Final Office Action dated Jun. 4, 2015 in U.S. Appl. No. 13/245,372, all pages.
Final Office Action dated Aug. 21, 2013 in U.S. Appl. No. 13/245,372, all pages.
Non-Final Office Action dated Feb. 5, 2013 in U.S. Appl. No. 13/245,372, all pages.
Non-Final Office Action dated Sep. 5, 2012 in U.S. Appl. No. 13/245,372, all pages.
Non-Final Office Action dated Jan. 26, 2012 in U.S. Appl. No. 13/245,372, all pages.
Final Office action dated Apr. 22, 2016 in U.S. Appl. No. 13/791,789, all pages.
Final Office Action dated Aug. 18, 2016 in U.S. Appl. No. 13/339,680, all pages.
Non-Final Office Action dated Jan. 14, 2016 in U.S. Appl. No. 13/339,680, all pages.
Non-Final Office Action dated Mar. 12, 2015 in U.S. Appl. No. 13/339,680, all pages.
Non-Final Office Action dated Jul. 10, 2014 in U.S. Appl. No. 13/339,680, all pages.
Final Office Action dated Oct. 15, 2013 in U.S. Appl. No. 13/339,680, all pages.
Final Office Action dated May 30, 2013 in U.S. Appl. No. 13/339,680, all pages.
Non-Final Office Action dated Jul. 25, 2012 in U.S. Appl. No. 13/339,680, all pages.
Non-Final Office Action dated Mar. 7, 2012 in U.S. Appl. No. 13/339,680, all pages.
Notice of Allowance dated Sep. 17, 2015 in U.S. Appl. No. 13/846,999, all pages.
Non-Final Office action dated Apr. 21, 2015 in U.S. Appl. No. 13/846,999, all pages.
Notice of Allowance dated Jun. 2, 2014 in U.S. Appl. No. 13/567,681, all pages.
Notice of Allowance dated Oct. 9, 2014 in U.S. Appl. No. 13/567,681, all pages.
Non-Final Office action dated Dec. 11, 2013 in U.S. Appl. No. 13/567,681, all pages.
Final Office action dated Apr. 30, 2012 in U.S. Appl. No. 12/976,890, all pages.
Non-Final Office action dated Jan. 18, 2012 in U.S. Appl. No. 12/976,890, all pages.
Final Office action dated Nov. 10, 2011 in U.S. Appl. No. 12/976,890, all pages.
Final Office action dated Jul. 15, 2011 in U.S. Appl. No. 12/976,890, all pages.
Final Office action dated Sep. 7, 2012 in U.S. Appl. No. 13/092,299, all pages.
Non-Final Office action dated May 24, 2012 in U.S. Appl. No. 13/092,299, all pages.
Non-Final Office action dated Dec. 22, 2011 in U.S. Appl. No. 13/245,324, all pages.
Final Office action dated Apr. 8, 2013 in U.S. Appl. No. 13/245,465, all pages.
Non-Final Office action dated Sep. 20, 2012 in U.S. Appl. No. 13/245,465, all pages.
Final Office action dated May 17, 2012 in U.S. Appl. No. 13/245,465, all pages.
Non-Final Office action dated Dec. 22, 2011 in U.S. Appl. No. 13/245,465, all pages.
Non-Final Office action dated Dec. 15, 2011 in U.S. Appl. No. 13/247,109, all pages.
Non-Final Office action dated Jul. 2, 2012 in U.S. Appl. No. 13/429,656, all pages.
Non-Final Office action dated May 23, 2013 in U.S. Appl. No. 13/543,045, all pages.
Non-Final Office action dated Feb. 5, 2013 in U.S. Appl. No. 13/624,029, all pages.
Notice of Allowance dated May 30, 2013 in U.S. Appl. No. 13/624,029, all pages.
Australian Patent Office, Examiner's First Report on Patent Application No. 2010202740 for Unicorn Media, Inc., dated Aug. 10, 2010, 3 pages.
Australian Patent Office, Examiner's First Report on Patent Application No. 2010202741 for Unicorn Media, Inc., dated Aug. 9, 2010, 4 pages.
Ben Atallah, S., et al. "Dynamic Configuration of Multimedia Applications," IFIP International Federation for Information Processing, 2003, 18 pages.
Final Office action dated Apr. 1, 2016 in U.S. Appl. No. 13/339,668, all pages.
Non-Final Office action dated Nov. 5, 2015 in U.S. Appl. No. 13/339,668, all pages.
Non-Final Office action dated Feb. 13, 2015 in U.S. Appl. No. 13/339,668, all pages.
Final Office action dated Feb. 1, 2013 in U.S. Appl. No. 13/339,668, all pages.
Non-Final Office action dated Mar. 9, 2012 in U.S. Appl. No. 13/339,668, all pages.
Non-Final Office action dated Jul. 27, 2012 in U.S. Appl. No. 13/339,668, all pages.
International Preliminary Report on Patentability dated Sep. 17, 2015 for International Patent Application No. PCT/US2014/017945, all pages.
International Search Report and Written Opinion dated Dec. 9, 2014 in International Patent Application No. PCT/US2014-056823, all pages.
Preinterview first Office action dated Feb. 20, 2014 in U.S. Appl. No. 14/086,801, all pages.
Non-Final Office action dated Jul. 9, 2014 in U.S. Appl. No. 14/086,801, all pages.
Non-Final Office action dated Apr. 8, 2015 in U.S. Appl. No. 14/086,801, all pages.
Notice of Allowance dated Jul. 22, 2015 in U.S. Appl. No. 14/086,801, all pages.
Notice of Allowance dated Jun. 22, 2012 in U.S. Appl. No. 13/430,081, all pages.

* cited by examiner

DYNAMIC CHUNKING FOR DELIVERY INSTANCES

CROSS-REFERENCES TO RELATED APPLICATIONS

This application is a continuation of U.S. patent application Ser. No. 13/791,789, filed Mar. 8, 2013, which will issue as U.S. Pat. No. 9,838,450 on Dec. 5, 2017, which is a continuation-in-part of, and claims the benefit of commonly assigned U.S. patent application Ser. No. 13/624,029, filed Sep. 21, 2012, which issued as U.S. Pat. No. 8,645,504 on Feb. 4, 2014, which is a continuation of, and claims the benefit of commonly assigned U.S. patent application Ser. No. 13/430,081, filed Mar. 26, 2012, entitled "Dynamic Chunking for Delivery Instances", which issued as U.S. Pat. No. 8,301,733 on Oct. 30, 2012, which is a continuation-in-part, and claims the benefit of commonly assigned U.S. patent application Ser. No. 12/976,883, filed Dec. 22, 2010, entitled "Dynamic Chunking For Media Streaming," which issued as U.S. Pat. No. 8,145,782, on Mar. 27, 2012, which claims priority to Australian Patent Application Serial No. 2010202741, filed Jun. 30, 2010, entitled "Dynamic Chunking For Media Streaming," each of which are incorporated by reference for all purposes.

Additionally U.S. patent application Ser. No. 13/339,668, filed Dec. 29, 2011, entitled "Dynamically-Executed Syndication Services" and U.S. patent application Ser. No. 13/339,680, filed Dec. 29, 2011, entitled "Multi-Platform Media Syndication Customization" are also incorporated by reference into this application for all purposes.

BACKGROUND OF THE INVENTION

This disclosure relates in general to cloud-based computer processing and, but not by way of limitation, to providing media for use in media streaming.

The delivery of media over networks such as the Internet can be accomplished in many ways, including progressive downloading or streaming. Streaming a media file typically involves downloading "chunks," or small segments, of the media file. Information including where chunks may be accessed can be stored in an index file (also known as a "manifest" file). This index file can be delivered to a client, such as a media player application, for use in streaming. Additional information may also be provided, which can alter the appearance of the client.

BRIEF SUMMARY OF THE INVENTION

Techniques are provided for dynamically creating index files for streaming media based on a determined chunking strategy. The chunking strategy can be determined using historical data of any of a variety of factors, such as Quality of Service (QoS) information. By using historical data in this manner, index files can be generated using chunking strategies that can improve these factors over time.

An example method of providing media with a data network, according to the disclosure, includes determining historical data related to streaming media with the data network, and receiving a request having a universal source locator (URL), where the URL includes information indicative of a requested media file. The method also includes determining one or more factors related to the request. The one or more factors related to the request include the historical data. The method further includes determining, with a processor, a chunking strategy based on the one or more factors related to the request, generating an index file having information for streaming the requested media file via the data network, where generating the index file is based, at least in part, on the chunking strategy, and providing the index file.

An example server configured to provide media via data network, according to the disclosure, includes a network interface for communicating with the data network, a memory, and a processor communicatively coupled with the memory and the network interface. The processor is configured to determine historical data related to streaming media with the data network, and receive a request having a universal source locator (URL), where the URL includes information indicative of a requested media file. The processor is further configured to determine one or more factors related to the request, where the one or more factors related to the request include the historical data. The processor is also configured to determine a chunking strategy based on the one or more factors related to the request, generate an index file having information for streaming the requested media file via the data network, where generating the index file is based, at least in part, on the chunking strategy, and provide the index file.

An example non-transitory computer-readable medium having instructions imbedded thereon for providing media with a data network, according to the disclosure, can have instructions, when executed by one or more computers, cause the one or more computers to determine historical data related to streaming media with the data network, and receive a request having a universal source locator (URL), where the URL includes information indicative of a requested media file. The instructions can further cause the one or more computers to determine one or more factors related to the request, where the one or more factors related to the request include the historical data, and determine a chunking strategy based on the one or more factors related to the request. The instructions can also cause the one or more computers to generate an index file having information for streaming the requested media file via the data network, where generating the index file is based, at least in part, on the chunking strategy, and provide the index file.

BRIEF DESCRIPTION OF THE DRAWINGS

The present disclosure is described in conjunction with the appended figures.

Figure 1:
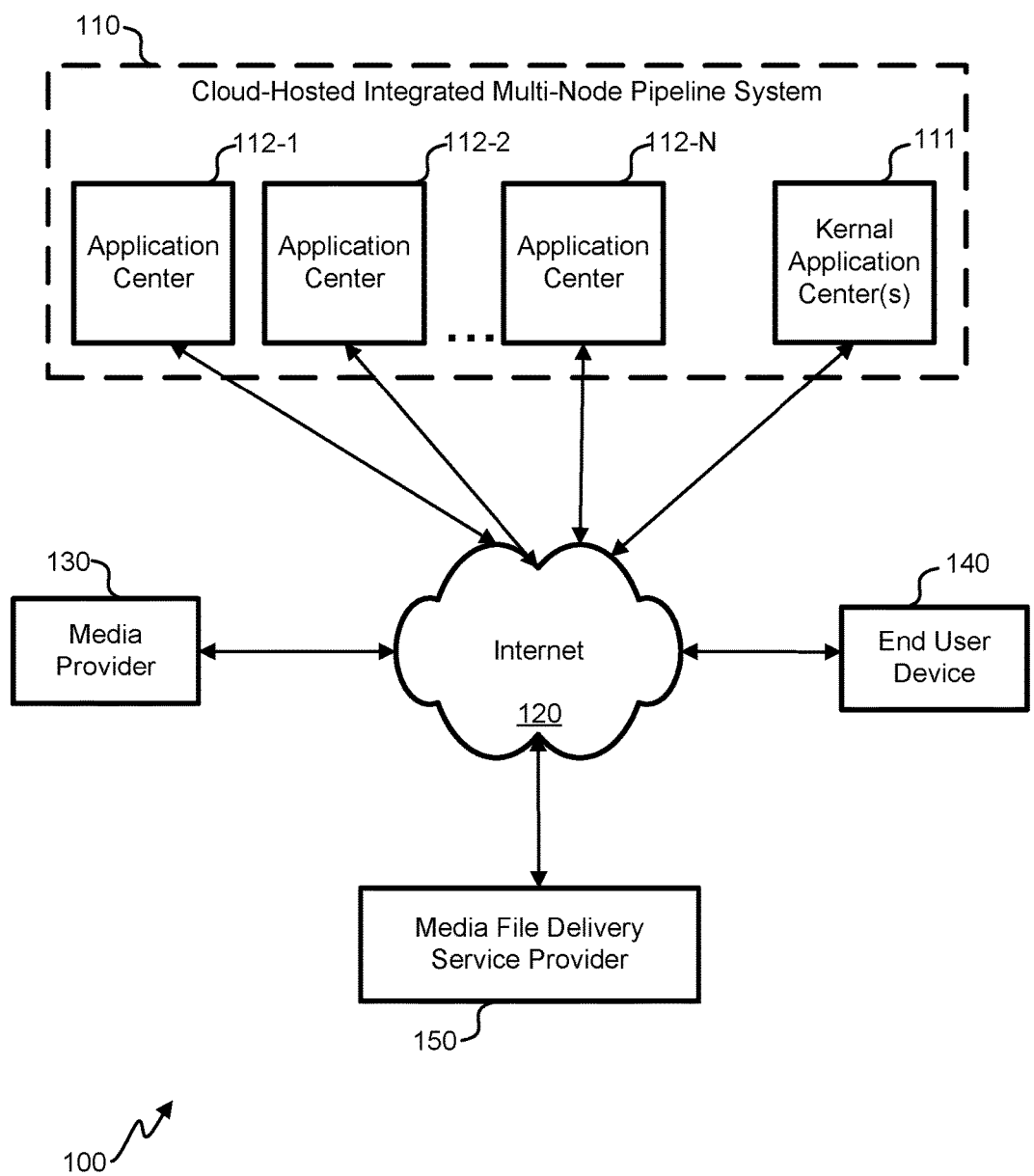
FIG. 1 illustrates a block diagram of a media servicing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media media providers. Media streaming has become a widely-used method of media distribution, but the preprocessing associated with streaming can be burdensome. Certain protocols, including forms of Hypertext Transfer Protocol (HTTP) streaming, require chunking and storing media assets, and generating a corresponding index files. These requirements can deprive a media provider of the ability to dynamically insert additional media such as advertisements into a media stream, and can consume a large amount of storage space to store chunks of media for a media asset, including chunks for any alternative sub-streams (e.g., streams with alternative bitrates, captions, alternative languages, etc.). Certain systems and methods can be utilized, however, to introduce the desired functionality back into the system.

A traditional approach to preprocessing media for streaming involves chunking and storing media assets, then creating corresponding index files to indicate where chunks may be located to download for streaming. Streaming protocols often provide for frequently updating an index file for instances where the corresponding media is frequently updated, such as during live streaming. Thus, an index file does not need to contain all chunks for a requested media asset. In addition, because media files are frequently stored in a format that requires little additional processing to chunk, the chunks can be created in real time, during the streaming of a media file. The systems and methods disclosed herein take advantage of these features to enable dynamic index file creation and dynamic media file chunking.

For instance, rather than preprocess media assets for streaming by chunking and indexing all files with relevant sub-streams prior to streaming the media, a server can dynamically create and update an index file during streaming. The dynamically-created index file can contain information regarding a next chunk of media in the various available sub-streams. The next chunk of media may not be cached at a location specified in the index file, in which case a chunk may be dynamically created by pulling all or part of the media file of interest from a media file origin, chunking it, and making it available for download. The chunk also may be cached, thereby eliminating the need to create the chunk again if it is requested at some later time.

Because the chunks are created during streaming, a media provider and/or media distributer can have more information and control during the streaming process. Rather than generate single index file for a given media asset, an instance of the index file generator may be created at the beginning of the media streaming to provide individualized media content to a particular end user and unique information regarding the streaming session to a media provider. The file index generator can vary the length of each chunk by, for example, indicating starting and ending points in the index file. Thus, the file index generator may determine a uniform chunk length for a media asset, varying the length of the chunks for different media assets, or the file index generator may adjust the length of the chunks within a single media asset. The index file generator can further insert additional media, such as an advertisement, at any time during the streaming by specifying the location of the additional media in the index file. The determination to insert advertisements can be based on any information, including data collected during the streaming session.

As the index file generator receives requests for and generates index files, it can further gather data regarding the streaming session for reporting to a media provider. Media providers often rely on beaconing data collected from media player applications to determine when an end user stops, plays, pauses, skips, etc., the streaming media content. Such information can be vital in determining the value of the media.

Because not all media player applications provide this beaconing data, the data gathered by the index file generator can serve as a substitute for or complement to the beaconing data. For example, if a request is made for a chunk that does not immediately follow a previously-requested chunk, a skip was made. If the amount of time elapsed between a previous request and a subsequent request exceeds the time for playback of the previously-requested chunk, a pause was made. If a request is not received within a certain time since a prior request, it can be determined that a stop was made.

As illustrated above, the state of a client may be determined from a variety of factors. This can include when the request for the index file is received, when the index file is provided, a length of time to play back the segment of media for streaming, and/or the starting and/or ending point of the segment of media for streaming. The determined state of a client may also be based on whether the request for the index file has been received within a certain amount of time since receipt of a previous request for an index file, whether the segment of media for streaming includes media other than the media file, and more. The state of a client and/or the data from which it was determined, may be used to create reporting data to serve as a substitute or complement to beaconing data from a client media player application. Because the index file generator can determine the length of the chunks, it therefore can determine the frequency of subsequent index file requests and the resolution of the reporting data based on the requests. The index file generator may log the reporting data and/or transmit the reporting data over a network during streaming.

The determined state of a client may be used by the index file generator and/or other services for various purposes. For example, it may be used in behavioral advertisement targeting and enforcement of session advertisement behavior, adjusting advertisement content and playback based on the behavior of a user as determined by the stated of a client. The state of a client further may be used to support resume features on a per client basis, allowing a user to continue playback of a media asset from a point at which the user had previously stopped playback. The state of a client also may be used to support individual encryption keys in an encryption scheme and allow the index file generator to return secure URLs (e.g., time expiring or Internet Protocol (IP) allowed) for chunks to support functions such as payment services.

Additionally or alternatively, the tasks of generating the index file and providing a location a requested chunk can be split up, thereby enabling the system to determine which chunks are actually requested. For example, a system may be configured to dynamically create an index file having links to one or more redirectors on the system. These redirectors can be configured to issue the location of the chunk, which can be created dynamically. The redirectors can further determine which chunk is actually requested, thereby enabling, among other things, calculation of Quality of Service (QoS) metrics, an increase the accuracy of reporting data, a decrease the frequency of index file generation if efficient to do so, and the ability to more easily handle keys of an encryption scheme.

While the above embodiments may be implemented in a variety of different systems, some particular embodiments may be implemented as part of a media service system. FIG. 1 is a block diagram illustrating a media servicing system 100, according to some embodiments of the present invention. The system may deliver media content to the end user device 140 through a network such as the Internet 120. The end user device 140 can be one of any number of devices configured to receive media over the Internet 120, such as a mobile phone, tablet computer, personal computer, portable media device, etc. A media asset provided by a media provider 130 can be processed and indexed by cloud-hosted integrated multi-node pipelining system (CHIMPS) 110, and further stored on media file delivery service provider (MFDSP) 150. Additionally or alternatively, the CHIMPS 110 may also be adapted to store the media asset.

The media servicing system further enables a media provider 130 or other entity to gather information regarding user behavior during media playback. For example, a media provider 130 can be provided with data indicating that end users tend to stop watching a video at a certain point in playback, or that users tended to follow links associated with certain advertisements displayed during playback. With this data, a media provider 130 can adjust factors such as media content, advertisement placement and content, etc., to increase revenue associated with the media content and provide the end user device 140 with a more desirable playback experience.

End user device 140 can request a media asset to stream with a client program executed by the end user device 140. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. The data object can include information about the media asset, including where the media asset can be located, such as within the MFDSP 150 or within the CHIMPS 150 itself. Location information may be provided by Universal Resource Indicator (URI), a Universal Resource Locator (URL) or other indicator. During playback of the media asset, the CHIMPS 150 can collect data regarding the playback through beaconing provided by a client program executed by the end user device 140 and/or indexing service from within the CHIMPS and/or MFDSP. The CHIMPS 150 can subsequently provide the data and/or any analytics information derived from the data to the media provider 130.

Figure 2A:
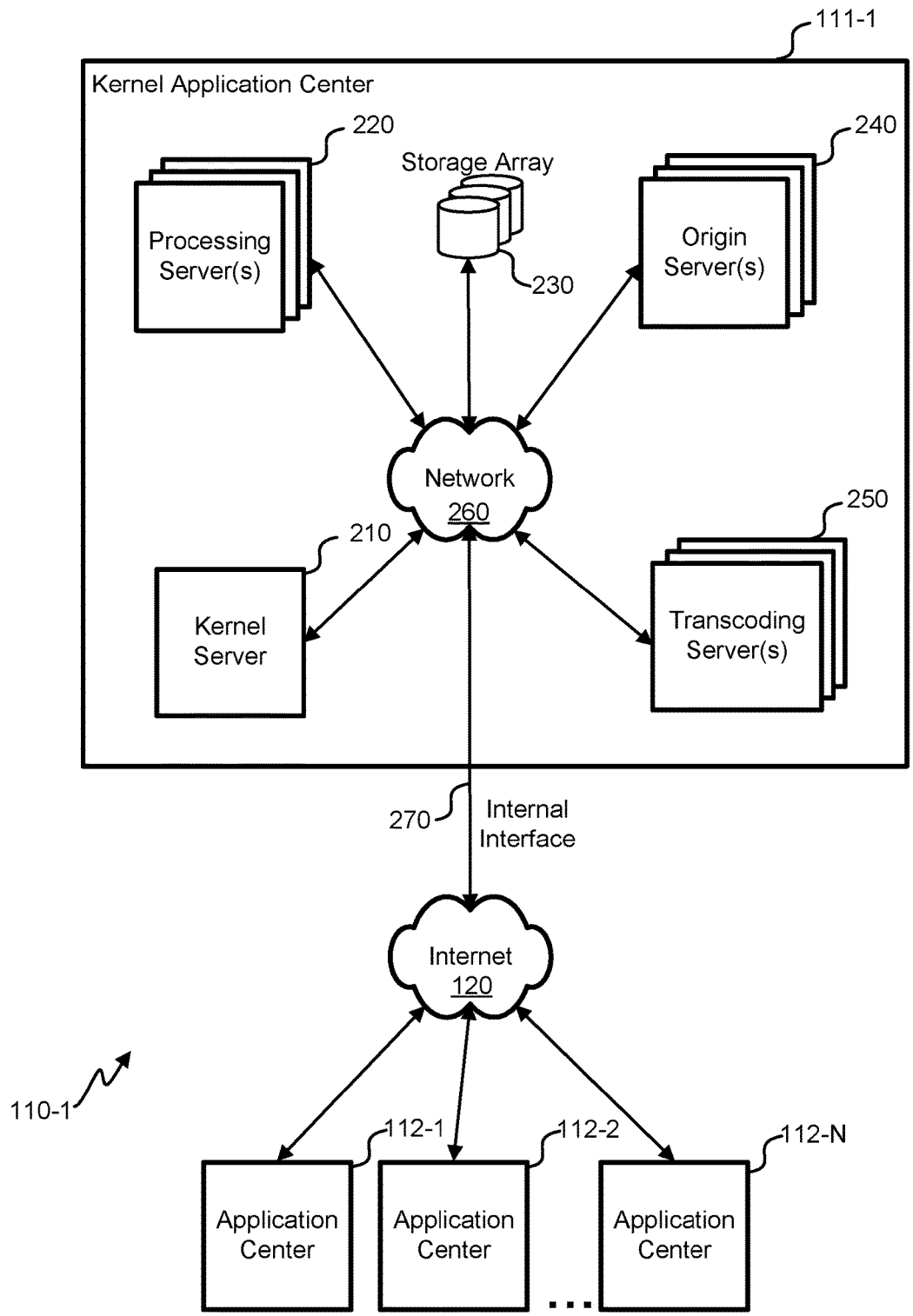
FIG. 2A illustrates a block diagram of an embodiment of a kernel application center connected with application centers.

FIG. 2A is a block diagram illustrating an embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user device 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media assets provided by a media provider 130 for syndication. Such a service can allow a media provider 130 to upload a media asset to an application center 112, after which the application center 112 would notify the kernel server 210 that the media asset has been uploaded. The kernel server can then notify services running on the processing server(s) 220 of the upload. These services can utilize transcoding server(s) to transcode the media asset, which can then be moved to a MFDSP and/or stored locally by storage array 230 and origin server(s) 240. Services running on the processing server(s) 220 can also update the associated data object stored by the storage array 230 and origin server(s) 240.

Figure 2B:
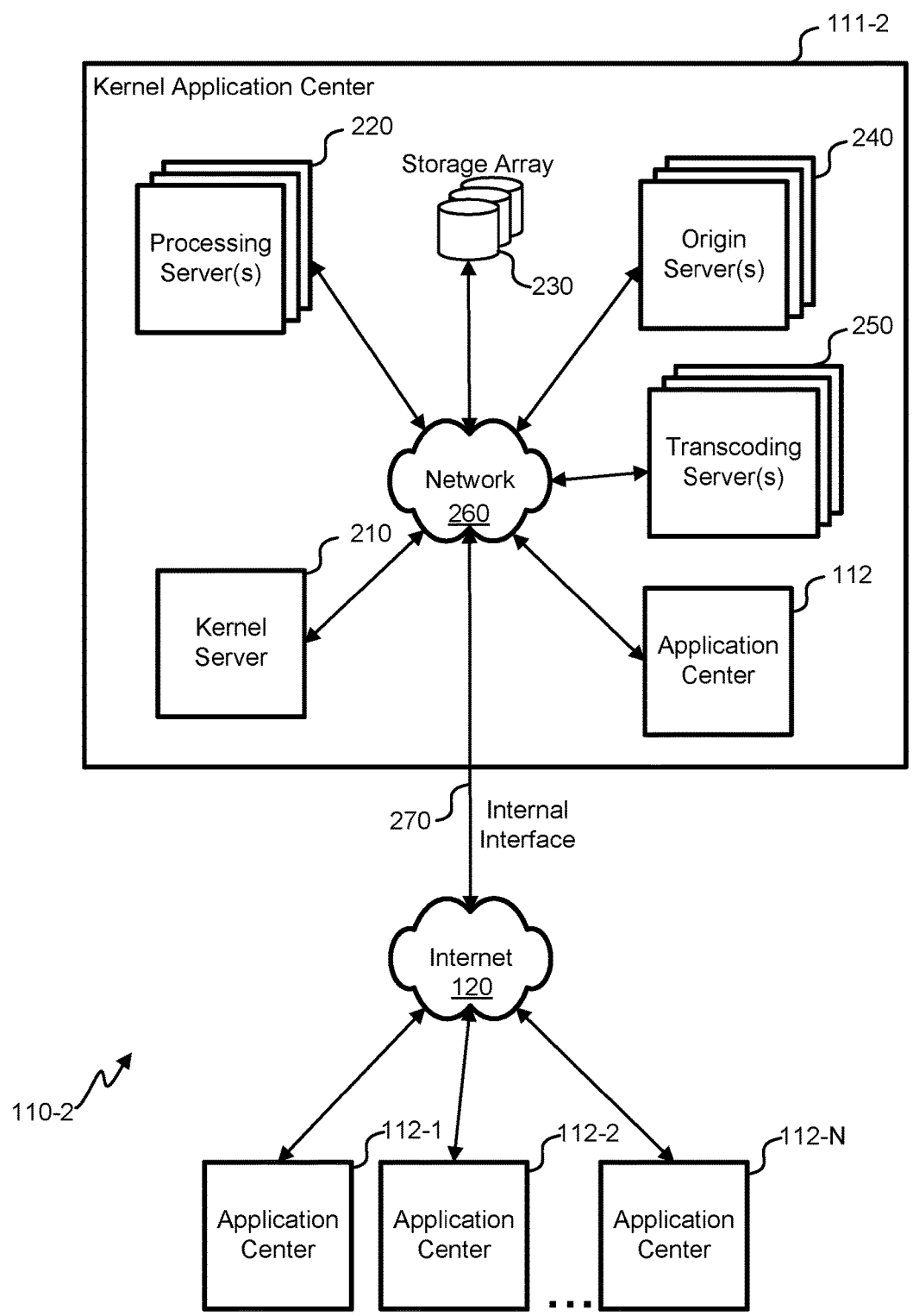
FIG. 2B illustrates a block diagram of an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
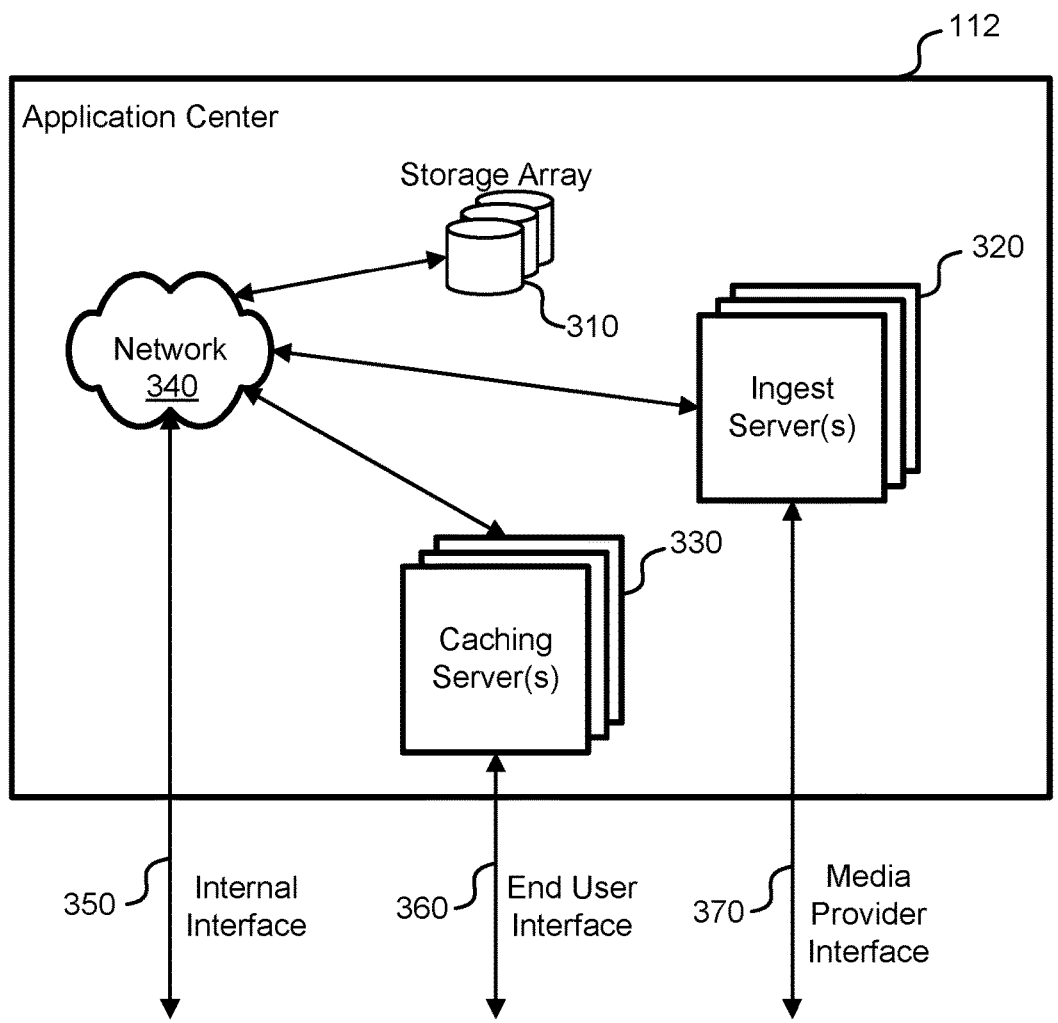
FIG. 3 illustrates a block diagram of an embodiment of an application center.

FIG. 3 is a block diagram illustrating an embodiment of an application center 112. The application center 112 can include caching server(s) 330 and a storage array 310 for storing and distributing data objects of media assets requested by end user devices through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media assets from a media provider 130 through a media provider interface 370. The media assets may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media assets stored on storage array 310 can be made available to a kernel application center 111 for services such as transcoding.

Figure 4:
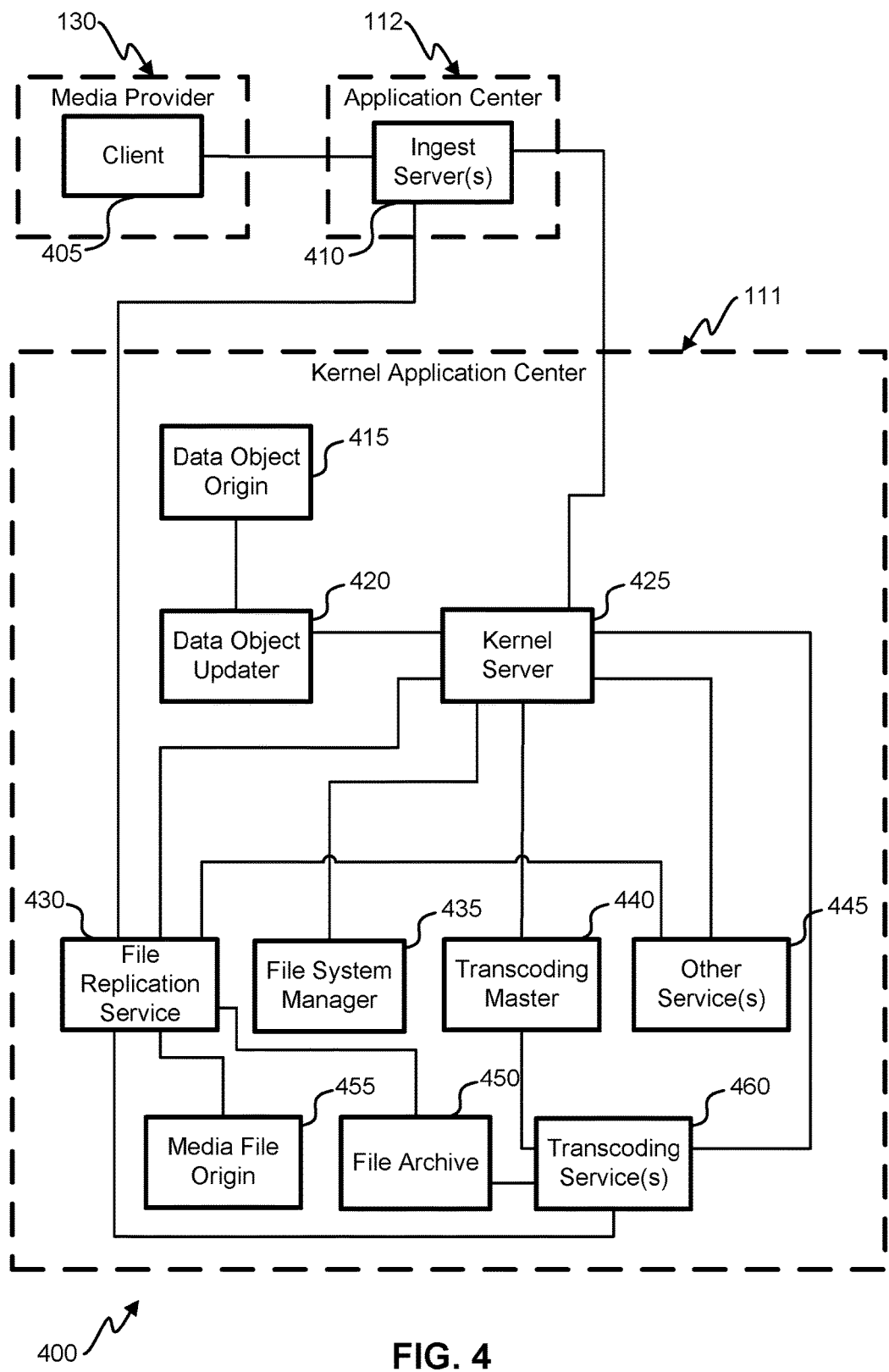
FIG. 4 illustrates a block diagram of processes and objects utilized by a cloud-hosted integrated multi-node pipelining system for media ingestion.

FIG. 4 is a block diagram 400 of processes and objects utilized by the CHIMPS 110 for media ingestion, according to some embodiments. Although FIG. 4 further indicates the physical systems in which my execute or store these processes and objects, it will be understood that the processes and objects disclosed may be executed or stored on more than one system, including systems not disclosed in FIG. 4. In other words, the processes and objects shown in FIG. 4 allow for a variety of implementations through one or more of hardware, software, firmware, microcode, etc.

Media can be ingested into the CHIMPS 110 when a media provider 130 uploads a media asset to ingestion server(s) 410 in an application center 112 by utilizing a client 405. The client 405 can be a stand-alone application or browser based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured organize the workflow among services such as transcoding 440 file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media assets between services. For example, retrieving the uploaded media asset from the ingest server(s) 410 and storing it on the file archive 450, or retrieving transcoded media assets from transcoding server(s) 460 and storing them in the media asset origin.

The data object updater 420 keeps the data object origin 415 up to date in response to any changes in the system. When, for example, a file is uploaded, transcoded, and stored in media asset origin 455, the location and other metadata concerning the transcoded media assets need to be created or updated in the data object origin 415 to ensure an end user device that accesses the object in the data object origin 415 has the correct information regarding the related media asset. Because the data object updater 420 receives updates from the kernel server 425 (which is notified when a transcoded media asset is stored in the media asset origin 455, the system ensures the data objects in the data object origin are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 425 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420 which updates the data object origin 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased. For example, a server of the CHIMPS 110 can be configured to dynamically switch its purpose based on external conditions such as load and overall system performance, providing functions such as transcode, upload, metrics collection, application web service, and more, on an as-needed basis.

Figure 5A:
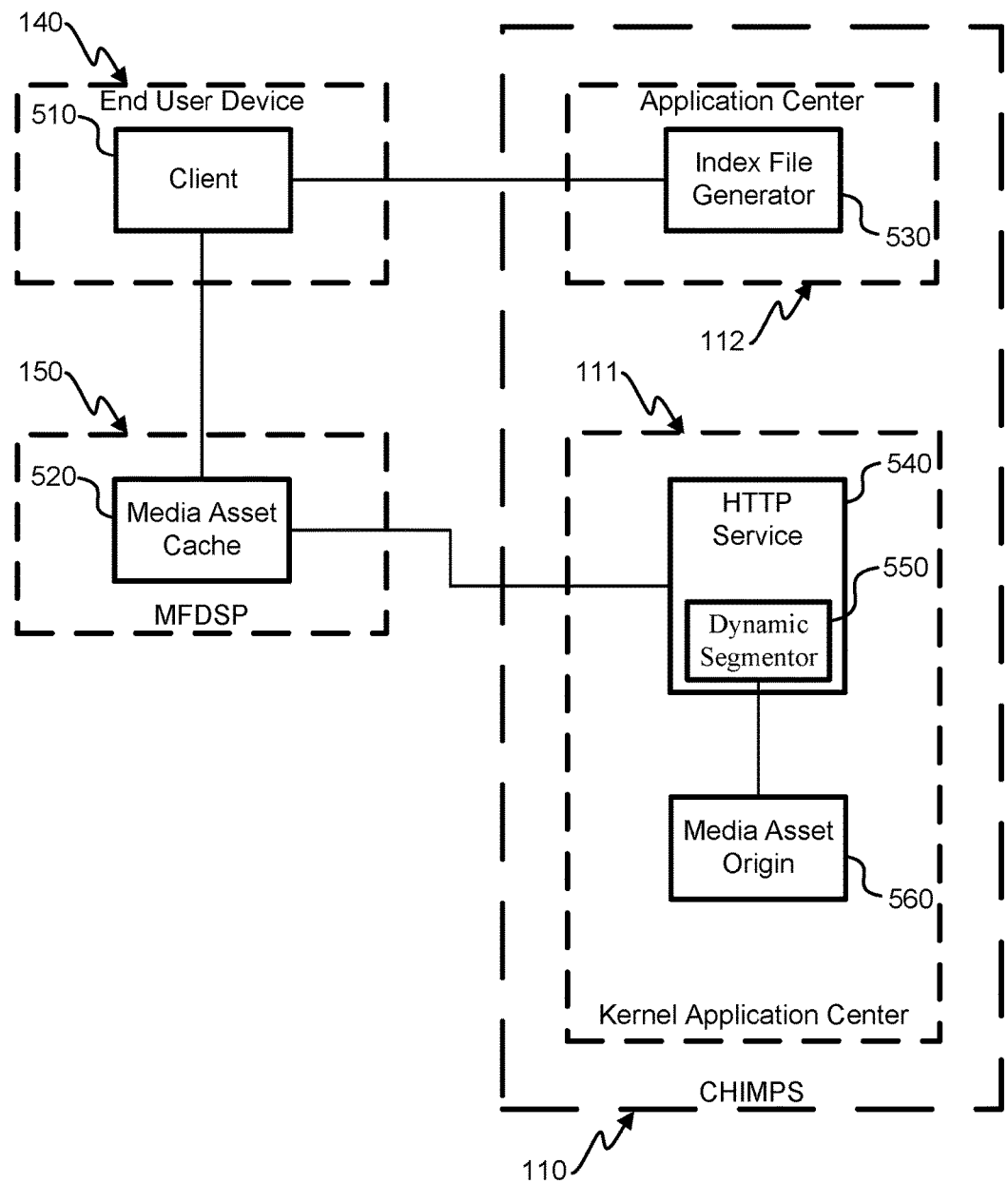
FIG. 5A illustrates a simplified block diagram of an embodiment of a system configured to provide dynamic indexing and chunking for media streaming.

Embodiments of such systems may include other systems that manage various requests from end users. For example, a system for dynamic index file generation and media file chunking. Referring to FIG. 5A, shows an embodiment of such a system 500-1. Media may be streamed to end user device 140 though a client 510. As mentioned above, the client 510 can be stand-alone media player, a plug-in, a browser, or other application, which can be executed on a personal computer or other electronic device.

An index file generator 530, as discussed previously, can be a program instantiated for media streaming to a particular client 510. The index file generator 530 can be executed on a server or other computing device within an application center 112 of the CHIMPS 110. Index files generated by the index file generator can include a wide variety of information such as starting, ending, and or run times for media chunks and locations for media chunks. This information can be embedded in a single string of data, such as a URI or a URL. If media includes various sub-streams (e.g., streams with alternative bitrates, captions, alternative languages, etc.) the index file can include data for chunks corresponding to each of the alternative sub-streams, as well as information regarding the bitrate and/or other unique information for each stream. Alternatively or in addition, index files indicating alternative sub-streams may be separate from index files indicating one or more media chunks for streaming.

It should be understood that the index file can further comprise a wide variety of formats, which can depend on the particular protocol. HTTP streaming may, for example, require index files to comprise one or more of M3U, M3U8, XML, and XML-based formats. Of course, other formats can be used in accordance with relevant streaming protocols.

Table 1 illustrates a simplified example of a generated index file in M3U9 format, indicating chunk of media for streaming. The index file in this example provides a URI for a chunk of media. The URI indicates the chunk is to be generated by dynamic segmentor 550, the chunk being 10 seconds long, starting at 9 seconds into the media file and ending 19 seconds into the media file.

TABLE 1

Example Index File Contents

EXTM3U
EXT-X-MEDIA-SEQUENCE:1
EXT-X-TARGETDURATION:10
EXTINF:10,
http://video.example.com/seg/9/19/seg1.ts Referring again to FIG. 5A, the index file generator 530 can also include an indicator within an index file to indicate whether a chunk of media is to be dynamically created. If, for example, it is determined that a requested media asset has not been chunked and that the asset will be chunked dynamically, the index file generator can include the indicator in data corresponding to a chunk of media to be created. The indicator, which can be as simple as including the term "/seg/" in a URL, will indicate that a requested chunk of media needs to be generated.

The chunks of media can be generated during media streaming by a dynamic segmentor 550, which can be incorporated into an HTTP service 540. The HTTP service 540, as well as the media asset origin 560 can be located within a kernel application center 111 of the CHIMPS 110 on, for example, a media asset origin server. The system 500-1 can be configured such that the kernel application center 111 provides dynamically-created chunks of media to a MFDSP 150 for delivery to client 510. The MFDSP 150 can store the chunks locally in, for example, a media asset cache 520, thereby forgoing the need to dynamically create a chunk again if the same chunk is requested in the future.

In sum, the system for dynamic index file generation and media asset chunking 500-1 can, after receiving a request for an index file from a client 510, dynamically generate an index file with an index file generator 530. The index file can, among other things, indicate where a next chunk of media may be located. A client can then request the chunk from the location indicated by the index file, which can comprise a media asset cache 520 in a MFDSP 150. If the chunk is not found in the media asset cache 520, the cache miss can redirect the request to a segmentor 550 of an HTTP service 540, which can dynamically generate the requested chunk of media by accessing the corresponding media asset in the media asset origin 560. The requested media chunk can then be provided to the MFDSP 150 for storage in the media asset cache 520 and delivery to the client 510. If the same chunk is requested at a later point in time, the MFDSP 150 can deliver the chunk from the media asset cache 520, thereby forgoing the need to redirect the request to the segmentor 550 to regenerate the chunk.

Figure 5B:
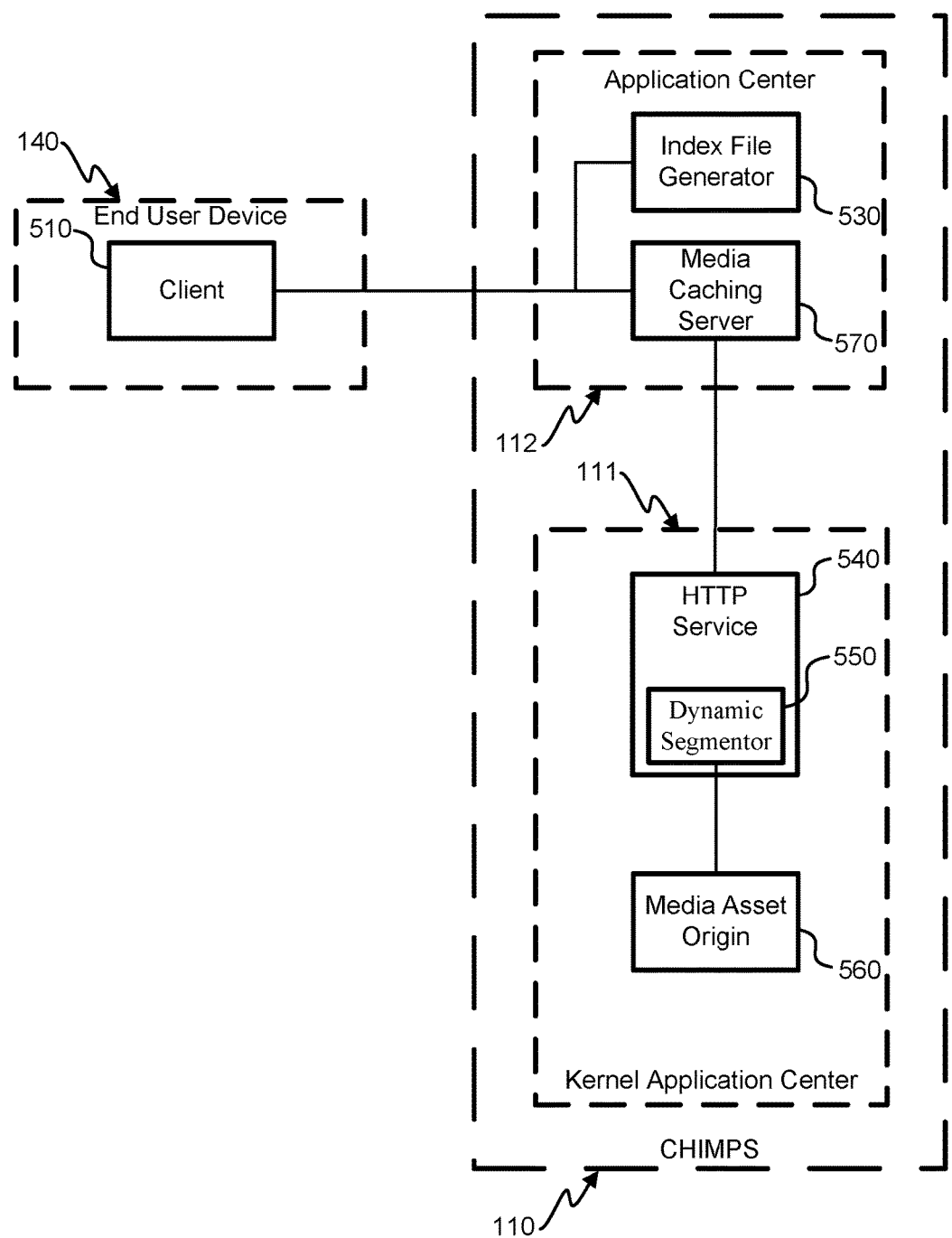
FIG. 5B illustrates a simplified block diagram of another embodiment of a system configured to provide dynamic indexing and chunking for media streaming.

FIG. 5B illustrates an alternative embodiment 500-2 of a system for dynamic index file generation and media file chunking. Rather than utilize a MFDSP, this embodiment 500-2 includes a media caching server within an application center 112 of the CHIMPS 110. The media caching server can receive chunk requests from and provide the corresponding chunks to a client. It will be understood that such a media caching server(s) or similar device(s) can be located anywhere within the CHIMPS and/or in a system(s) communicatively linked to the CHIMPS.

Figure 5C:
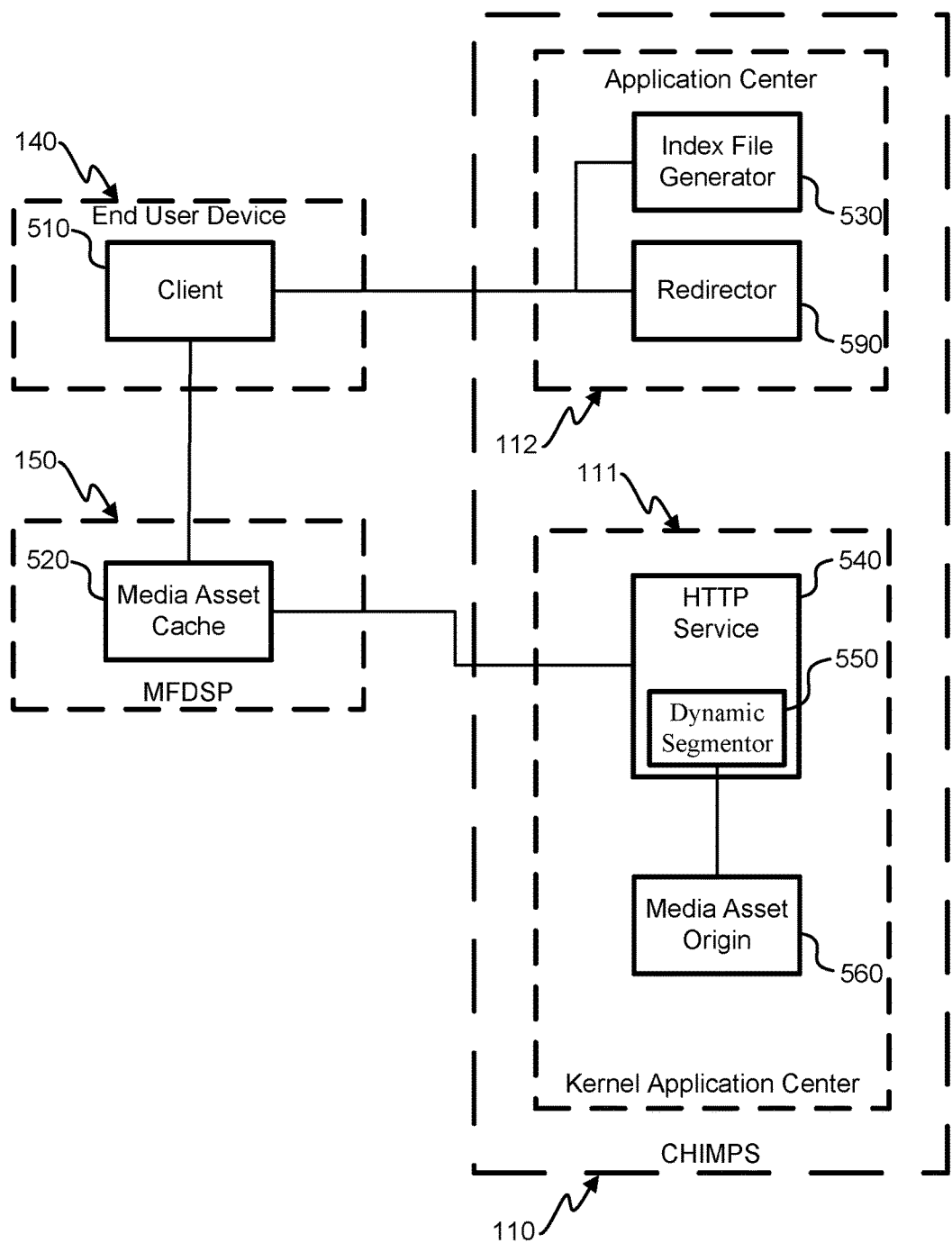
FIG. 5C illustrates a simplified block diagram of another embodiment of a system configured to provide dynamic indexing and chunking for media streaming, utilizing a redirector.

FIG. 5C illustrates an embodiment 500-3 of a system for index file generation used in conjunction with a redirector 590. As discussed above, an index file generator 530 may create an index file having one or more URIs or other location information directing the client 510 to one or more redirectors 590. Redirector 590, can then provide the URI of the requested chunk with a redirect, such as a redirect under HTTP status code 302. The URI can be located on a MFDSP 520 or other location (such as a media caching server 570) and/or dynamically created by the dynamic segmentor 550. It will be understood that there can be any number of redirectors 590, which can be at any location, including locations of the CHIMPS 110 such as the application center 112 (as shown in FIG. 5C) or the kernel application center 111. It also will be understood that the URI or other location information provided by redirector 590 can be generated by or provided to the redirector 590 in any number of ways. The URI can be generated, for example, based on the request received by redirector 590 from client 510. Finally, it will be understood that the CHIMPS 110 can be configured to dynamically implement any combination of embodiments 500-1, 500-2, and 500-3, further choosing whether to utilize one or more redirectors based on factors such as, for example, a detected type of client 510.

Embodiments utilizing one or more redirectors can have several advantages. For example, and not by way of limitation, if a certain client were implemented in such a way that it "reads ahead" to request chunks, it could result in incorrect reporting data. Thus, it would be advantageous to determine which chunk is actually requested by the client.

Additionally or alternatively, where chunks are available in various sub-streams with different bitrates, determining the actual requested chunk can be useful in calculating Quality of Service (QoS) metrics. Furthermore, it there may be scenarios in which it is more efficient to create larger index files having many chunks comprising large segments of media, reducing the number of index files required to stream a media asset, and thereby reducing the processing requirements to create the index files. If encryption is used having, for example, a rotating key or a per client key encryption scheme in which a valid key might change during playback of a media asset, it also may be advantageous to incorporate redirector(s) for handling legacy keys for some period of time.

Figure 6:
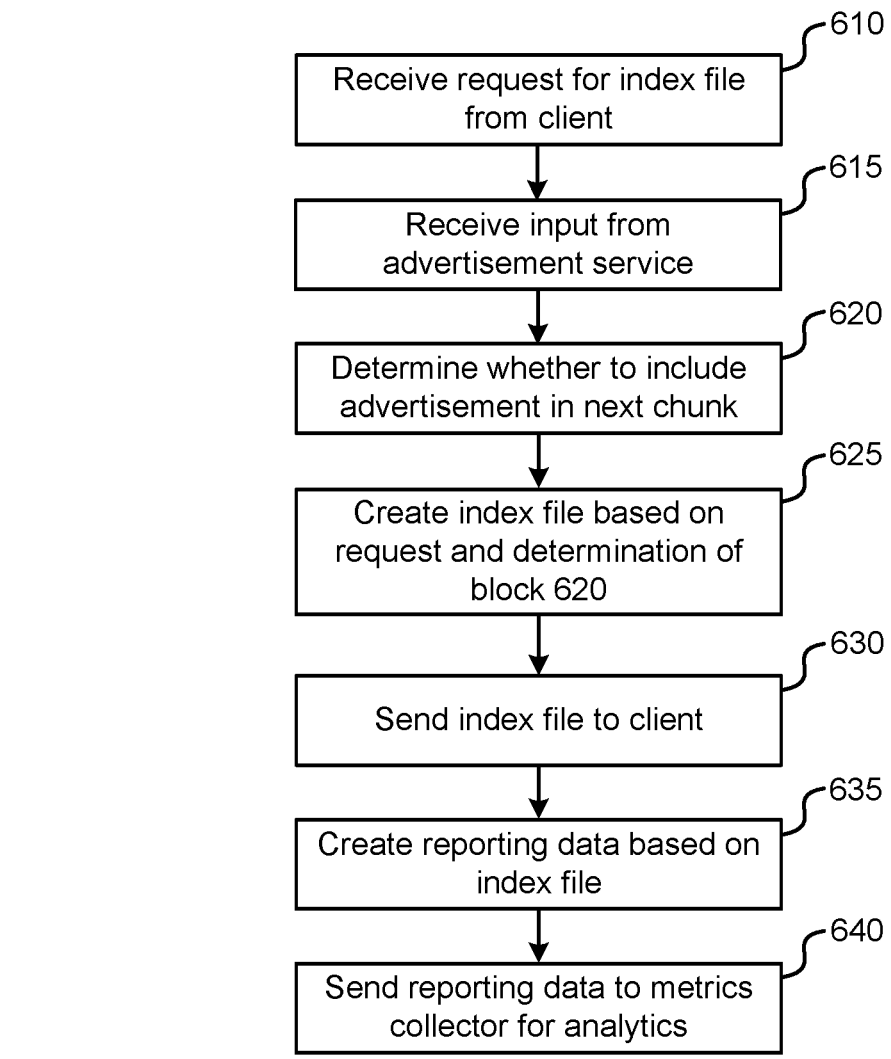
FIG. 6 illustrates a simplified flowchart of an embodiment of a method for implementing a dynamic index for media streaming.

FIG. 6 illustrates a simplified flowchart of an embodiment of a method 600 for implementing a dynamic index for media streaming. The method 600, which can be executed by the index file generator 530, begins at block 610, where a request for an index file is received from a client 510. According to media streaming protocols contemplated by this embodiment, if data regarding a chunk of media is not provided in an initial index file, the client will continue to request or refresh an index file until it reaches an indicator in the index file that signals the end of a stream. Thus, the method can be assured to receive more than one request for an index file from a client provided that an initial index file does not include an indicator signaling the end of the stream.

At block 615, the method 600 additionally provides for receiving input from an advertising service. According to some embodiments, this input could be the availability of an advertisement, and can be provided by a service inside or outside the CHIMPS. In other embodiments, the input could come from a service that factors in any of a variety of factors to indicate that a specific advertisement or type of advertisement should be shown. Or that any advertisement should be shown.

At block 620, a determination is made whether to include an advertisement in the next chunk. According to some embodiments, this determination can be made with or without input from an advertisement service. It should be known that this determination can include the factors used by an advertisement service to provide the input of block 615. Whether the determination includes input from an advertisement service of block 615 or not, the determination can still include factors such as information about an end user collected before or during streaming of the media. This can include behavior of the end user during streaming of the media (as determined, for example, by machine-based logic through beaconing data and/or requested chunks of media provided by a client 510). Factors can also include information regarding the media asset used for streaming (such as type of content or preferred points within the media for an advertisement), preference(s) and/or selection(s) of an end user, when a previous advertisement was shown, time of day, and more. It can further include information regarding the source of a media asset, such as who created and/or provided the asset for viewing by an end user. It will be understood that other embodiments contemplate include secondary media, other than advertisements into the media stream in this manner. Moreover, the secondary media and/or advertisement can be of any length and also may be chunked. Thus, it may be determined that the next chunk includes all, or a select portion, of an advertisement of any specific length.

An index file is created based on the request as well as the determination of whether media, such as an advertisement, should be streamed, indicated by block 625. As discussed above, the index file can assume a variety of formats and include any amount of information regarding a next chunk of media for streaming. For example, HTTP streaming can utilize index files having the URLs of available chunks of media. Information can be embedded in these URLs to indicate a location to download the corresponding chunk of media, starting point and/or ending point of a chunk of media, an indicator to indicate whether the chunk is to be dynamically created by a segmentor 550, a location of an advertisement to be streamed, and more. This information is included in the index file and sent to the client at block 630.

At block 635, reporting data can be created based on information included in the index file. As previously discussed, information included in an index file and/or index file request can indicate the behavior of an end user device 140 during streaming, such as a pause, stop, skip, play, etc. of the media. According to some embodiments, this information can be extracted from requests for an index file and/or providing the requested index file. The information can be gathered in addition to or as a substitute for beaconing data provided by a client 510. Moreover, if beaconing data is provided, the creation of reporting data may be omitted altogether.

Reporting data can include any amount of information regarding end user behavior, as indicated through index file requests and/or provided index files. This can include a particular action and when it was performed. Additionally or alternatively, the data may be kept in a more rudimentary form, depending on the application or embodiment, indicating the data included in a index file request and/or an index file. This reporting data may be stored in a log file for reporting after streaming and/or transmitted during streaming to a relevant service that collects such metrics.

As indicated by block 640, the reporting data may be sent to a metrics collector for analytics. A metrics collector, according to certain embodiments, may be an application executed by a server from within the application center 112 in which the index file generator 530 is executed, or it may be executed elsewhere, such as in a kernel application center 111 or in a system outside the CHIMPS 110. Depending on the form of the reporting data, the metrics collector can further process and store the information.

Figure 7:
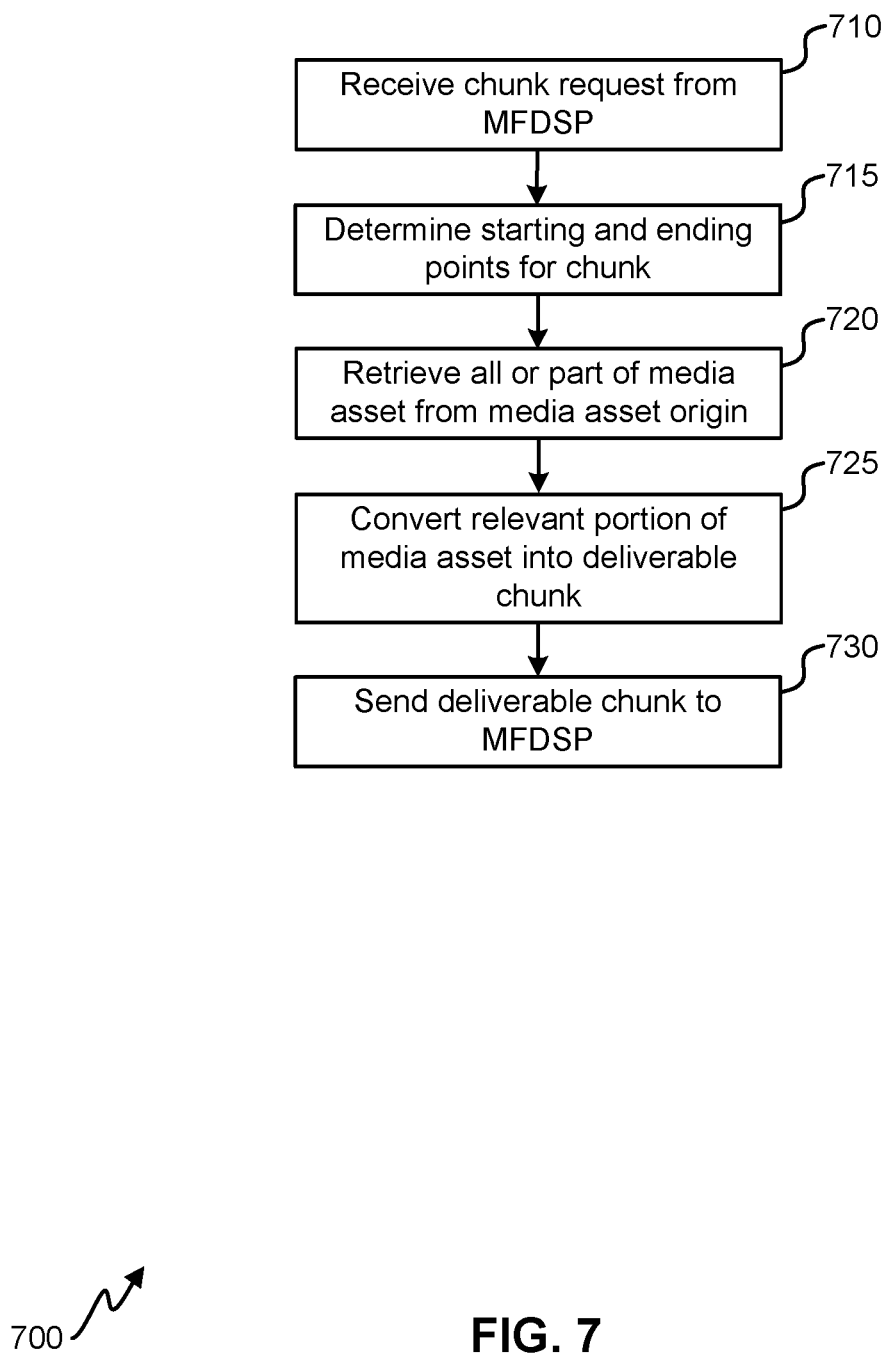
FIG. 7 illustrates a simplified flowchart of an embodiment of a method for dynamically chunking a media file for streaming.

FIG. 7 illustrates a simplified flowchart of an embodiment of a method for dynamically chunking a media file for streaming 700. This method can be employed by a variety of systems and/or programs. For example, it may be executed by a dynamic segmentor 550 of an HTTP service 540 running on a server located in a kernel application center 111 of the CHIMPS 110.

The method 700 can begin at block 710, when a request for a chunk of media is received from a MFDSP 150. As discussed above, this request may be made in response to a cache miss at the MFDSP 150 and/or because an indicator was included in the request for the chunk of media that the chunk was to be created dynamically. As discussed herein, if the MFDSP 150 has the requested chunk cached from a prior request, the MFDSP 150 can provide the requested chunk and preclude the need to send the request to a dynamic segmentor 550 to generate the chunk. It should be understood that the request may come from sources other than a MFDSP 150 according to alternative embodiments. One such source includes the media caching server 570 of embodiment 500-2, as shown in FIG. 5B.

The starting and ending points of a requested chunk of media are then determined at block 715. This information can be included directly in the request or derived from the request, a previous request, and/or other sources. At block 720, the information, as well as information identifying the requested chunk of media, can be used to retrieve all or part of the relevant media asset from a media asset origin 560. The retrieved portion will include at least the relevant media from the starting point to the ending point of the requested chunk of media.

At block 725, the requested media chunk is generated by converting the relevant portion of the media asset into a deliverable chunk. The media asset, as stored in the media asset origin, may not be chunked; it may be stored in its entirety as a media file (or group of alternative files corresponding to alternative sub-streams). Generating the chunk therefore can require determining the starting and ending points from the retrieved portion of the media asset and converting the resulting segment of media into a deliverable chunk.

Although the generation of the deliverable chunk may involve transcoding, it may not. The media asset can be stored in a format where transcoding may not be needed, thereby reducing the processing requirements for creating chunks of media during streaming. For example, media assets may be stored such as H.264 or MPEG-4 video format and/or AAC, HE-AAC, or MP3 audio format. According to some streaming protocols, such as some forms of HTTP streaming, chunks of media in these formats would not need transcoding before being wrapped in an MPEG-2 transport stream container format. Instead, such a conversion essentially would require the addition of metadata to create the streaming format from the format of the stored media asset. In other words, generating a deliverable chunk of media may only require identifying the stored media asset, extracting the relevant segment of the media from the media asset, and adding certain metadata in accordance with a container format. This process requires little processing power and can be easily performed on the fly during streaming. Once the deliverable chunk of media is generated, it is sent to the MFDSP 150 or other requesting entity, at block 730.

Figure 8:
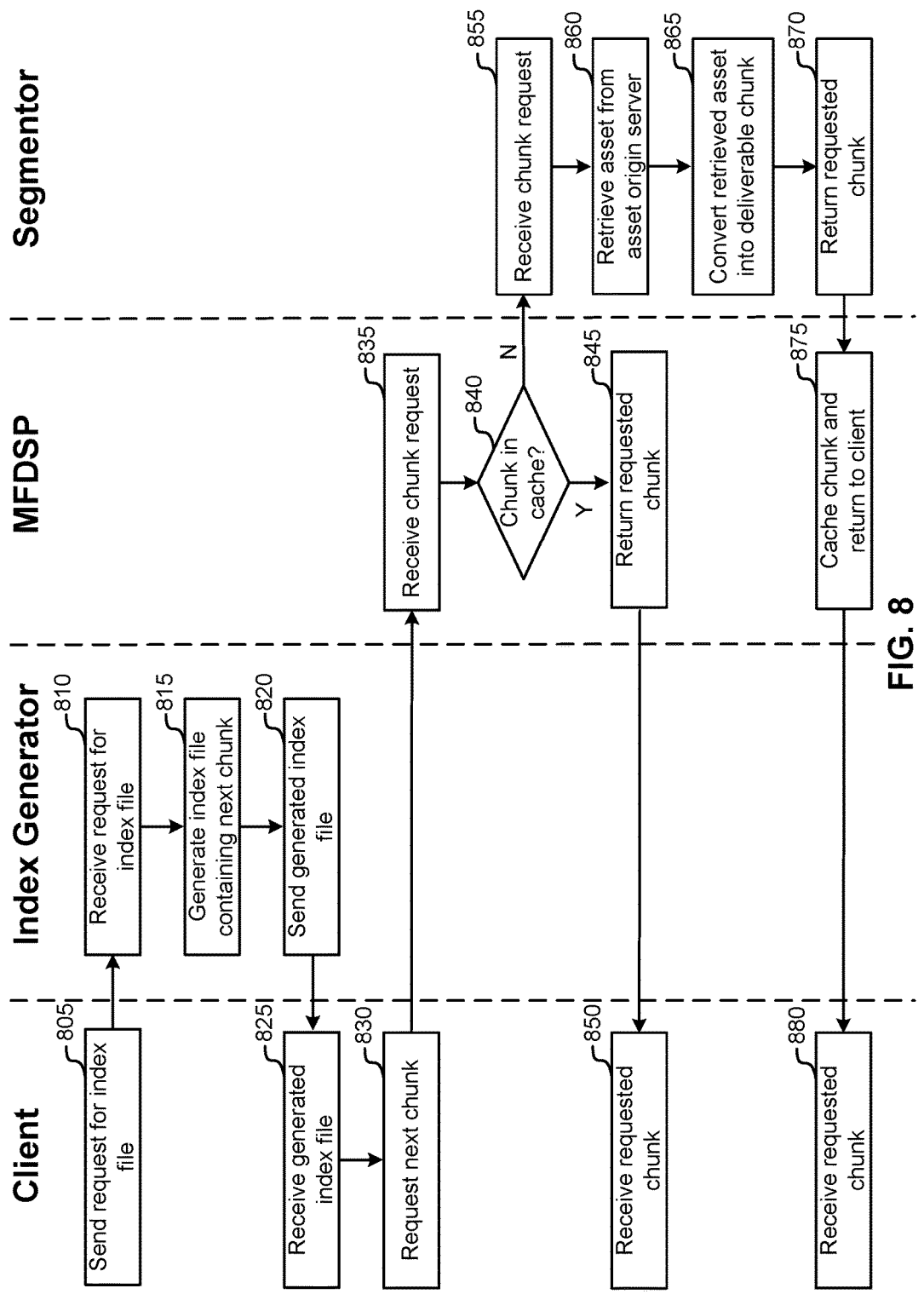
FIG. 8 illustrates a simplified swim lane flowchart describing the interaction of components in a system configured to provide dynamic indexing and chunking for media streaming, according to one embodiment.

FIG. 8 illustrates a simplified swim lane flowchart describing the interaction of components in a system configured to provide dynamic indexing and chunking for media streaming, according to one embodiment. In this embodiment, a client can send a request for an index file 805, the request received by an index file generator 810. A particular request may be made to initiate the streaming of a media asset, or it may be during streaming. Depending on the streaming protocol, the request may be made while a client plays a chunk of media previously downloaded during streaming.

The index file generator generates an index file to indicate the next chunk of media 815. As described above, this chunk may include an advertisement, and the index file can include any amount of information about a chunk of media, including information regarding alternative sub-streams for streaming. The dynamic index file generator can include information regarding existing chunks of media, and, when used in conjunction with a dynamic segmentor may also include information regarding chunks of media that may need to be created. As detailed above, if a chunk of media is to be generated dynamically, the index file generator may indicate this by including an indicator in the generated index file, such as in a URL for one or more chunks described within the index file. Once the index file is generated, the index file generator sends the index file 820, which is received by the client 825.

Alternative embodiments may provide for the generation of index files containing more than a next chunk of media. For example, an index file generator may generate an index file containing information regarding several chunks of media, in which case the chunks of media can be dynamically generated by a dynamic segmentor when requested by the client. The determination of whether to include information regarding more than a next chunk of media can include factors such as whether the index generator is generating reporting data, the desired frequency of such reporting data, and more.

Using information contained in the index file, the client can then request the next chunk of media 830, and this request can be received by a MFDSP 835. The MFDSP then checks to see if the chunk is already stored in the cache 840. If so, the MFDSP can provide the requested chunk to the client, blocks 845 and 850. The requested chunk may be found in a MFDSP's cache if the chunk was created and stored in the MFDSP during preprocessing or if the chunk was dynamically created and stored in the MFDSP from an earlier request.

If the chunk is not found on the MFDSP, the chunk can be requested of the dynamic segmentor, which receives the request 855 and retrieves the corresponding media asset from an asset origin server 860. As discussed above, the entirety of the relevant media asset does not need to be retrieved as long as at least the portion containing the relevant segment for the requested chunk is retrieved. It will be understood that alternative embodiments can provide for the media asset being stored in a variety of locations accessible, directly or indirectly, to the dynamic segmentor.

The dynamic segmentor can then generate the requested chunk by converting the retrieved media into a deliverable chunk. That is, the dynamic segmentor converts the retrieved media into an acceptable format for streaming, which can vary depending on the streaming protocol utilized. The dynamic segmentor can then return the requested chunk 870 to the MFDSP, which can cache the chunk and return it to the client 875. Once the chunk is received by the client 880, the client can play the chunk to an end user.

The techniques for creating index files and/or creating corresponding chunks of media can be adapted for each request. This allows the CHIMPS 110 (or similarly-enabled system) to provide optimal chunking for each delivery instance, which can differ even among similar devices, depending on any of a variety of factors. For example, a new version of a particular device type (e.g., a particular smart phone, set-top box, tablet, etc.) may have the same operating system and/or browser as an older version of the device type, but with a larger buffer than the older version. As such, optimized chunking for delivery instances involving the old and new versions of the device type may differ in that delivery to the new version can include using chunk sizes that would cause a buffer overflow in the older version. By dynamically determining and implementing a chunking strategy for each delivery instance in this manner, the CHIMPS 110 (or similarly-enabled system) can help provide the optimal user experience under any of a variety of circumstances.

Figure 9:
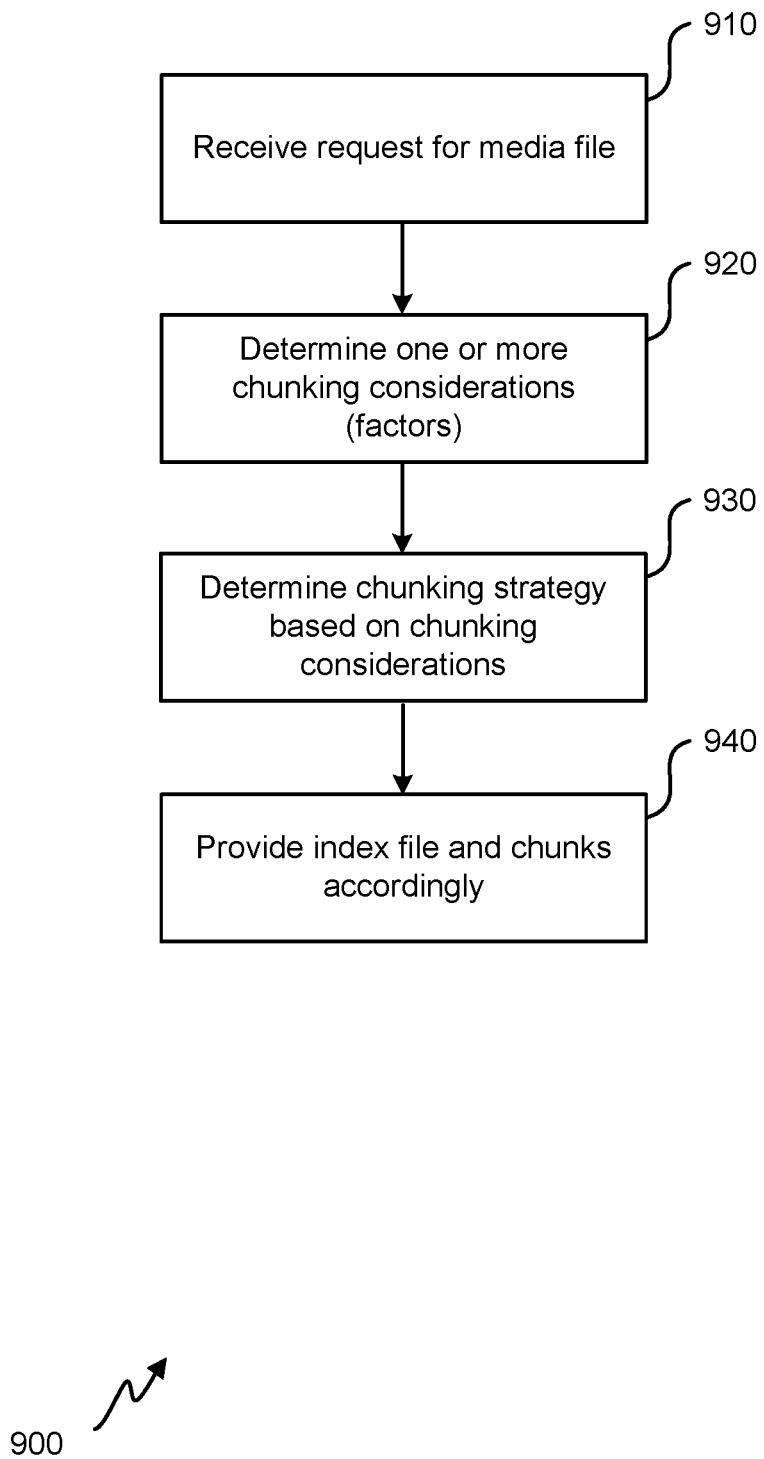
FIG. 9 illustrates a simplified flow chart providing a basic method for adapting chunking techniques for each delivery instance.

FIG. 9 is a simplified flow chart illustrating a basic method 900 for adapting chunking techniques for each delivery instance. At block 910, a request for a media file is received. In other embodiments, the request may be for a live stream or other media asset not stored as a media file. At block 920, one or more chunking considerations are determined. Because the streaming of a media file can involve multiple requests (and, correspondingly, multiple index files), the method 900 may be performed multiple times during the playback of a media file.

Chunking considerations are factors that can impact any aspect of the chunking of a media file and/or advertisements included in the delivery of the media file. Such considerations can include, but are not limited to, bandwidth, codec, processor type, buffer size, memory and/or processor utilization, battery, network type, geographic location, whether a device is moving, a location in the playback of the media file, and the like.

The bandwidth of a device, for example, can impact the size of the chunks delivered to the device. For a relatively low bandwidth, the chunk size may be reduced so that chunks are downloaded more quickly, which may reduce the chance that a media player would need to interrupt playback to while waiting for the next chunk to be delivered. Conversely, chunk size can be increased for higher bandwidths. Similarly, the chunks may be adapted to accommodate a particular network type (e.g., WiFi, mobile wireless network, land line (wired), etc.), which can determine, or be indicative of, an available bandwidth.

Different aspects of the hardware of a device can also be considered when chunking a media file. In addition to the buffer size, as indicated above, a processor type can also impact how a file is chunked—such as the size of the chunk and/or the codec used. Additionally or alternatively, QoS metrics can indicate memory and/or processor utilization, including during playback of the requested media file, which can impact the chunking of the media file.

Chunking considerations further can include a variety of factors related to mobile devices. For example, whether a device is situated in a particular geographic location, at a particular event (where large numbers of mobile devices may be located), and/or the device is moving can impact the available bandwidth to the device. The battery level of a mobile device may also impact the bandwidth in certain circumstances. The CHIMPS 110 (or other chunking system) can anticipate changes in bandwidth by determining such chunking considerations and adjusting the chunking accordingly. Moreover, QoS, bandwidth, and/or other information from multiple devices can be aggregated to help the CHIMPS 110 further adapt media chunking for related delivery instances. Thus, the chunking considerations for streaming to one device may include information regarding one or more other devices. For example the CHIMPS 110 may anticipate a sudden reduced bandwidth for a particular delivery instance related to a cell phone where it is determined that other cell phones nearby on the same carrier have had sudden drops in bandwidth.

Chunking considerations further can include a type of codec used and/or a location in the playback of the media file. Certain codecs, for example, may require or prohibit the use of certain-sized chunks. Also, for example, if the playback of the media file has just started, smaller chunks may be used to help ensure that playback begins quickly, without the need to wait for larger chunks to be delivered. Also, chunk sizes can be altered to accommodate ad insertion or similar interleaving of media content at particular point(s) in the playback of the media file.

Chunking considerations may be determined from information included in the request, a database, and/or other sources, which may disclose data such as a URL, client ID, globally-unique identifier (GUID) or other identifier, a network type, a device type and/or capability, an operating system executed by the end user device, an application, application identifier, application state, or other application information, a location associated with the device, information associated with a user of the end user device 140, information regarding the requested media file (e.g., genre, length, rating(s), ownership, artist, etc.). Additionally or alternatively, the request may simply include information that enables one or more of these items to be determined. Additionally or alternatively, a repository may be stored, maintained or derived, and queried for authorization, authentication, validation, or selection; for example, a repository of application identifiers may be maintained and queried to determine whether an application is authorized to request the content and if so, to select further aspects of or for processing the content request. Additionally or alternatively, such stored or derived repository data may be used in conjunction with other data, either internally or externally identified, such as a secret key, shared key, public key, stored certificate, other stored data, or other data for authorization, authentication, validation, or selection, including data stored on another digital service, on another server, on the client device, in a device associated with the client device, in the operating system, in the application, in another application, in a network, or in another location from which it may be retrieved.

As indicated previously, the determination of chunking considerations can include utilizing information other than the information provided in the request. This may involve accessing information stored in one or more a databases or other data structures internal or external to the CHIMPS 110. It may also involve communicating with other entities and/or systems, such as a content owner or media provider 130. Additionally or alternatively, chunking considerations can be gathered using data independent of information provided in the request, such as the time at which the request was received.

At block 930, a chunking strategy based on chunking considerations is determined. And at block 940, the corresponding index file and chunks are provided accordingly. As indicated above, the chunking strategy (i.e., the way in which the chunks are created and delivered) can be impacted by the chunking considerations, including the size of the chunks, the length of the playback of the chunks, and the choice of codec used. Furthermore, multiple considerations can be taken into account to determine the chunking strategy.

This chunking strategy can be implemented on the fly (i.e., immediately before or during playback of the media file) utilizing the dynamic indexing and chunking techniques discussed above. For example, an index file generator 530 can incorporate the chunking strategy into a dynamically-generated index file, and the dynamic segmentor 550 can produce the requested chunks accordingly. Because the contextual data and chunking strategies can vary for each delivery instance, the content of the index files corresponding to requests for the same media file can be different (e.g., indicate different chunk sizes, codecs to use, etc.), based on differing chunking strategies.

Historical data can also be utilized when determining a chunking strategy. Historical data can be based on any of a variety of previously-obtained information regarding, for example QoS, network conditions, client type, previous chunking strategies, content consumption analytics, and the like. For instance, QoS data regarding previous chunking strategies can be used to determine whether previous chunking strategies were successful. If so, the same or similar chunking strategy can be used again. Otherwise, a different chunking strategy can be used.

On particular type of information that can be useful when analyzing historical data is QoS information. QoS information—from one or multiple devices—can indicate memory and/or processor utilization, including during playback of a requested media file, which can be used to adjust the chunking of the media file. Additionally or alternatively, information from entities such as QoS providers can shed light on the type of client making the request for the media file, which can be taken into consideration when determining a chunking strategy. In some cases, content distribution network providers contract with QoS providers to deliver region-specific data indicating delivery performance and buffering over their tiered distribution architecture. This data can be used to tailor chunk length and boundaries within the content to optimize on a per content delivery network, per region basis the ability to cache the content, deliver the content bytes, decrease time to first byte, and the like.

Figure 10:
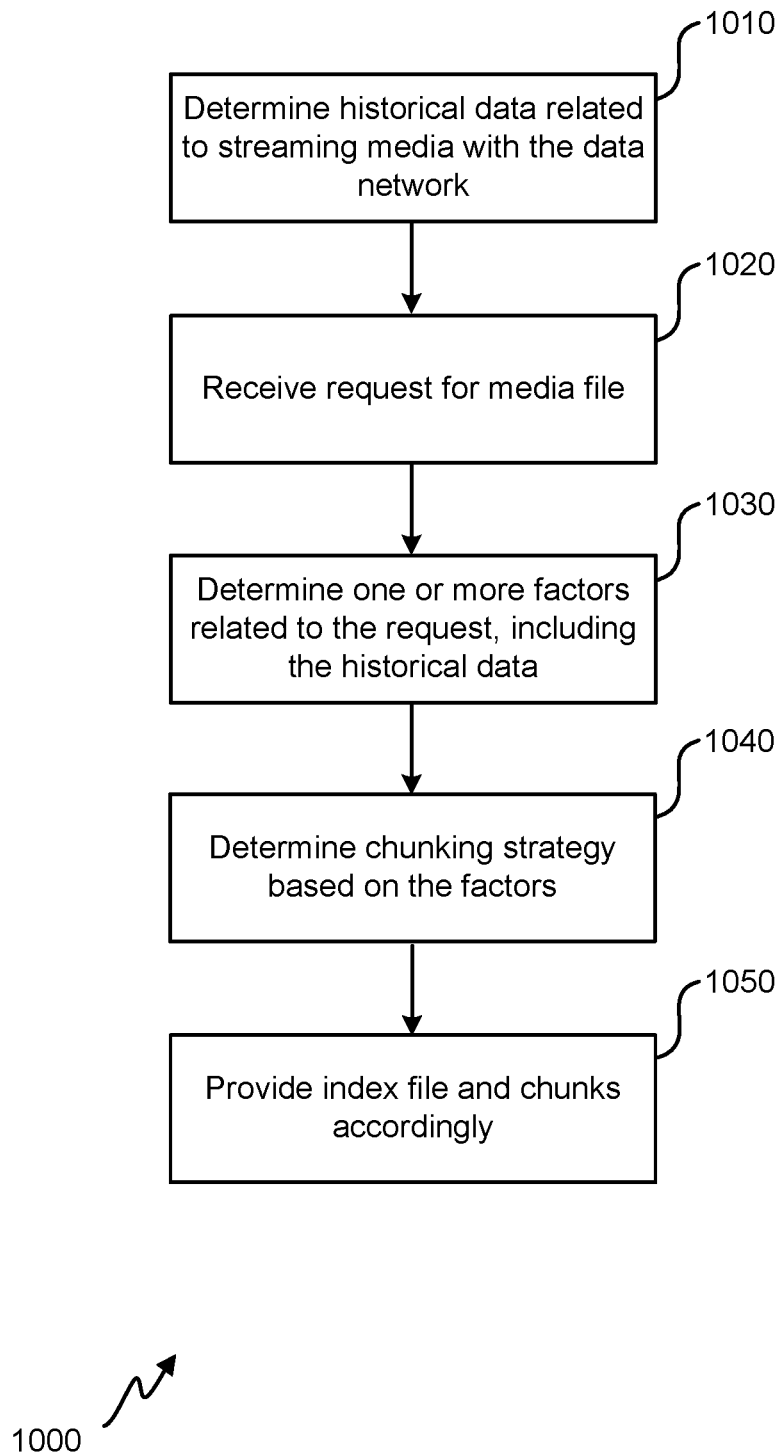
FIG. 10 illustrates a simplified flow chart illustrating a basic method for adapting chunking techniques for each delivery instance based on historical data, according to one embodiment.

FIG. 10 is a simplified flow chart illustrating a basic method 1000 for adapting chunking techniques for each delivery instance based on historical data. As with other figures provided herein, FIG. 10 is provided as an example method for illustrative purposes. Alternative embodiments may implement similar methods by combining, separating, omitting, and/or adding to the blocks illustrated in FIG. 10. Additionally or alternatively, the functions illustrated in some or all of the blocks may be performed in a different order and/or simultaneously, depending on desired functionality. Moreover, as with other methods described herein, some or all of the method 1000 illustrated in FIG. 10 may be performed by one or more computers. Such computers can, for example, form part of the CHIMPS 110, Index File Generator 530, and/or other systems described herein above. A person of ordinary skill in the art will recognize many implementations and/or variations.

At block 1010, historical data related to streaming media with the data network is determined. The historical data can include, for example, data obtained from streaming one or more media files over time. Additionally or alternatively, the historical data can include information regarding network conditions, QoS, client type, previous chunking strategies, and the like, which may or may not be associated with the streaming of media files. Furthermore, as indicated previously, QoS information can be obtained from other entities, such as a QoS provider, and may include information regarding a type of client making the request.

Blocks 1020-1050 echo blocks 910-940 of FIG. 9, as described above. At block 1030, however, the historical data is included as one of the one or more factors related to the request which used, at block 1040, to provide at least part of the basis with which the chunking strategy is determined. In this manner, the method 1000 of FIG. 10 can allow the successes and/or failures of prior chunking strategies to improve chunking strategies going forward, ultimately improving QoS and/or other factors over time.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-volatile computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of providing media with a data network, the method comprising:
   receiving, from a client application via the data network, a request having a universal source locator (URL), wherein the URL includes information indicative of a requested media file;
   in response to receiving the request:
      determining one or more factors related to the request, wherein the one or more factors related to the request include historical data obtained from streaming media with the data network; and
      determining, with a processor, a chunking strategy based on the historical data, wherein the chunking strategy is indicative of a format, a bit rate, or both;
   generating an index file having information for streaming the requested media file via the data network, the information including:
      a Universal Resource Indicator (URI) of a chunk for streaming the requested media file, and
      information regarding one or more characteristics of the chunk to be used in the generation of the chunk, wherein the index file is generated during playback of the requested media file by the client application, and the generating is based, at least in part, on the chunking strategy; and
   making the index file available to the client application.

2. The method of providing media with the data network as recited in claim 1, wherein the historical data includes Quality of Service (QoS) information regarding a previously-streamed media file.

3. The method of providing media with the data network as recited in claim 2, further comprising obtaining the QoS information from a QoS provider.

4. The method of providing media with the data network as recited in claim 2, wherein the QoS information comprises information regarding a type of client making the request.

5. The method of providing media with the data network as recited in claim 2, wherein the QoS information is based on information obtained from streaming media to a plurality of devices.

6. The method of providing media with the data network as recited in claim 1, wherein the chunking strategy includes one or more of:
 a size of the chunk for streaming the requested media file,
 a length of playback of the chunk for streaming the requested media file, or
 a codec to use for streaming the requested media file.

7. A server configured to provide media via data network, the server comprising:
 a network interface for communicating with the data network;
 a memory; and
 a processor communicatively coupled with the memory and the network interface, the processor further configured to:
  receive, from a client application via the data network, a request having a universal source locator (URL), wherein the URL includes information indicative of a requested media file;
  in response to receiving the request:
   determine one or more factors related to the request, wherein the one or more factors related to the request include historical data obtained from streaming media with the data network; and
   determine a chunking strategy based on the historical data, wherein the chunking strategy is indicative of a format, a bit rate, or both;
  generate an index file having information for streaming the requested media file via the data network, the information including:
   a Universal Resource Indicator (URI) of a chunk for streaming the requested media file, and
   information regarding one or more characteristics of the chunk to be used in the generation of the chunk;
  generate the index file during playback of the requested media file by the client application, based, at least in part, on the chunking strategy; and
  make the index file available to the client application.

8. The server configured to provide media via the data network as recited in claim 7, wherein the processor is configured to determine the historical data by obtaining Quality of Service (QoS) information regarding a previously-streamed media file.

9. The server configured to provide media via the data network as recited in claim 8, wherein the processor is further configured to obtain the QoS information from a QoS provider.

10. The server configured to provide media via the data network as recited in claim 8, wherein:
 the QoS information comprises information regarding a type of client making the request; and
 the processor is further configured to process the QoS information to determine the historical data.

11. The server configured to provide media via the data network as recited in claim 8, wherein the QoS information is based on information obtained from streaming media to a plurality of devices.

12. The server configured to provide media file via the data network as recited in claim 7, wherein the processor is configured to determine the chunking strategy by determining one or more of:
 a size of the chunk for streaming the requested media file,
 a length of playback of the chunk for streaming the requested media file, or
 a codec to use for streaming the requested media file.

13. The server configured to provide media file via the data network as recited in claim 7, wherein the processor is configured to generate the index file during playback of the requested media file by the client application.

14. A non-transitory computer-readable medium having instructions imbedded thereon for providing media with a data network, wherein the instructions, when executed by one or more computers, cause the one or more computers to:
 receive, from a client application via the data network, a request having a universal source locator (URL), wherein the URL includes information indicative of a requested media file;
 in response to receiving the request:
  determine one or more factors related to the request, wherein the one or more factors related to the request include historical data obtained from streaming media with the data network; and;
  determine a chunking strategy based on historical data, wherein the chunking strategy is indicative of a format, a bit rate, or both;
 generate an index file having information for streaming the requested media file via the data network, wherein generating the index file is based, the information including:
  a Universal Resource Indicator (URI) of a chunk for streaming the requested media file, and
  information regarding one or more characteristics of the chunk to be used in the generation of the chunk,
  wherein the index file is generated during playback of the requested media file by the client application, and the generating the index file is based, at least in part, on the chunking strategy; and
 make the index file available to the client application.

15. The non-transitory computer-readable medium as recited in claim 14, further comprising instructions for causing the one or more computers to determine the historical data by obtaining Quality of Service (QoS) information regarding a previously-streamed media file.

16. The non-transitory computer-readable medium as recited in claim 15, further comprising instructions for causing the one or more computers to obtain the QoS information from a QoS provider.

17. The non-transitory computer-readable medium as recited in claim 15, wherein:
 the QoS information comprises information regarding a type of client making the request; and
 the instructions further include instructions for causing the one or more computers to process the QoS information to determine the historical data.

18. The non-transitory computer-readable medium as recited in claim 15, wherein the QoS information is based on information obtained from streaming media to a plurality of devices.

19. The non-transitory computer-readable medium as recited in claim 14, wherein the instructions for causing the one or more computers to determine the chunking strategy include instructions for determining one or more of:
- a size of the chunk for streaming the requested media file,
- a length of playback of the chunk for streaming the requested media file, or
- a codec to use for streaming the requested media file.

\* \* \* \* \*